(12) United States Patent
Higashi et al.

(10) Patent No.: US 11,922,079 B2
(45) Date of Patent: Mar. 5, 2024

(54) INFORMATION PROCESSING APPARATUS, IMAGE FORMING SYSTEM, METHOD, AND NON- TRANSITORY COMPUTER-READABLE STORAGE MEDIUM

(71) Applicant: CANON KABUSHIKI KAISHA, Tokyo (JP)

(72) Inventors: Shogo Higashi, Kanagawa (JP); Yoshiji Kanamoto, Tokyo (JP); Kosuke Tsujita, Tokyo (JP); Koichiro Manabe, Kanagawa (JP); Kazuo Wakai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/221,958

(22) Filed: Jul. 14, 2023

(65) Prior Publication Data

US 2024/0036781 A1   Feb. 1, 2024

(30) Foreign Application Priority Data

Aug. 1, 2022   (JP) ................. 2022-122810

(51) Int. Cl.
*G06F 3/12*   (2006.01)

(52) U.S. Cl.
CPC .......... *G06F 3/1217* (2013.01); *G06F 3/1208* (2013.01); *G06F 3/1254* (2013.01)

(58) Field of Classification Search
CPC ..... G06F 3/1254; G06F 3/1208; G06F 3/1217
See application file for complete search history.

(56) References Cited

U.S. PATENT DOCUMENTS

2003/0206224 A1* 11/2003 Sakakibara ............. B41J 29/13
                                                                347/108
2015/0037055 A1*  2/2015 Kitagawa .......... G03G 15/2028
                                                                 399/68

FOREIGN PATENT DOCUMENTS

JP   2006-251441 A   9/2006

* cited by examiner

*Primary Examiner* — John R Wallace
(74) *Attorney, Agent, or Firm* — VENABLE LLP

(57) ABSTRACT

An information processing apparatus includes an obtaining unit that obtains a job including a plurality of pages, and a determining unit that determines a page group constituted by consecutive sheets of a same sheet type, from the plurality of pages included in the job obtained by the obtaining unit. A setting unit sets a transport speed of sheets in the page group determined by the determining unit.

14 Claims, 21 Drawing Sheets

FIG. 4

| | |
|---|---|
| BOOT LOADER | ~401 |
| OPERATING SYSTEM | ~402 |
| NETWORK CONTROL PROGRAM | ~403 |
| JDF FUNCTION PROGRAM | ~404 |
| PDL FUNCTION PROGRAM | ~405 |
| SHEET MANAGEMENT PROGRAM | ~406 |
| SETTING MANAGEMENT PROGRAM | ~407 |
| | |
| OTHER PROGRAMS | ~408 |

FIG. 5

| | |
|---|---|
| BOOT LOADER | ~501 |
| OPERATING SYSTEM | ~502 |
| NETWORK CONTROL PROGRAM | ~503 |
| JOB MANAGEMENT PROGRAM | ~504 |
| Pre-RIP PROGRAM | ~505 |
| PDL FUNCTION PROGRAM | ~506 |
| SCHEDULER PROGRAM | ~507 |
| OTHER PROGRAMS | ~508 |

FIG. 6

| ID (601) | MEDIUM NAME (602) | SIZE (603) | TYPE (604) | BASIS WEIGHT (605) | FIRST PRINT SPEED (606) | SECOND PRINT SPEED (607) |
|---|---|---|---|---|---|---|
| ... | ... | ... | ... | ... | ... | ... |
| 010 | COATED PAPER A | A4 | BOTH SIDES COATED | 200g | AVAILABLE | AVAILABLE |
| 011 | COATED PAPER B | A4 | BOTH SIDES COATED | 200g | AVAILABLE | AVAILABLE |
| 012 | COATED PAPER C | A4 | SINGLE SIDE COATED | 200g | AVAILABLE | AVAILABLE |
| ... | ... | ... | ... | ... | ... | ... |
| 020 | COATED PAPER X | A4 | BOTH SIDES COATED | 200g | NOT AVAILABLE | AVAILABLE |
| ... | ... | ... | ... | ... | ... | ... |

FIG. 7A

| System settings | Print job defaults | System adjustments |

- Print Quality adjustments — 701
- Colourcast correction: Cyan
- Colourcast correction: Magenta
- Colourcast correction: Yellow
- Colourcast correction: Black
- White gap correction
- Low temperature environment mode
- Uneven gloss correction
- Adjust drum temperature
- Special smoothing
- Productivity priority — 702

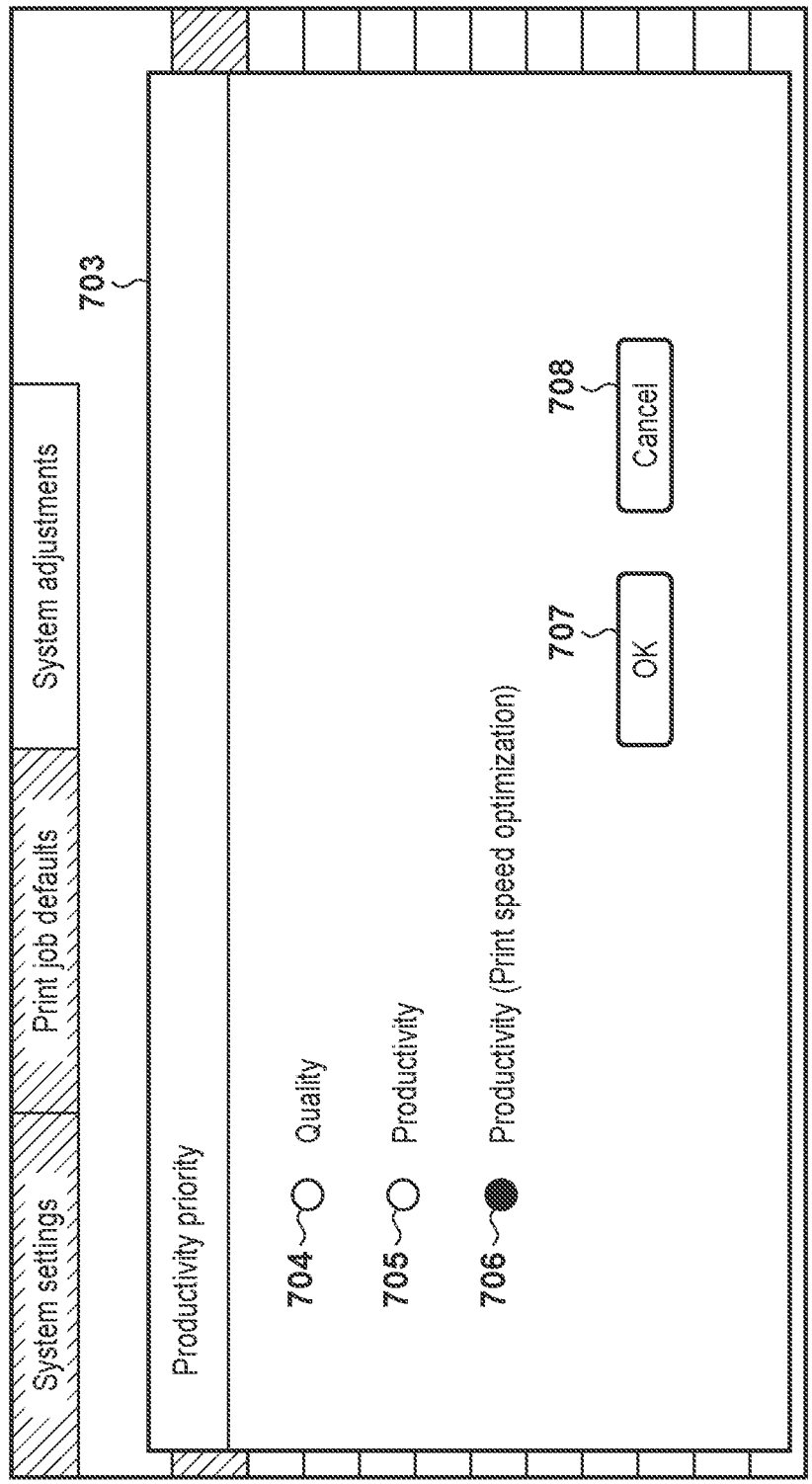

FIG. 8B

| PAGE (SHEET) 803 | SHEET ID 804 | SHEET TYPE 805 | |
|---|---|---|---|
| 1 | 011 | COATED PAPER B | ⎫ |
| ⋮ | ⋮ | ⋮ | ⎬ 806 |
| 99 | 011 | COATED PAPER B | ⎭ |
| 100 | 020 | COATED PAPER X | 807 |
| 101 | 012 | COATED PAPER C | ⎫ |
| ⋮ | ⋮ | ⋮ | ⎬ 808 |
| 599 | 012 | COATED PAPER C | ⎭ |
| 600 | 020 | COATED PAPER X | 809 |
| 601 | 011 | COATED PAPER B | ⎫ |
| ⋮ | ⋮ | ⋮ | ⎬ 810 |
| 999 | 011 | COATED PAPER B | ⎭ |
| 1000 | 020 | COATED PAPER X | 811 |
| 1001 | 012 | COATED PAPER C | ⎫ |
| ⋮ | ⋮ | ⋮ | ⎬ 812 |
| 1300 | 012 | COATED PAPER C | ⎭ |

$$T = \left( \frac{60}{v2} - \frac{60}{v1} \right) x$$

SPEED SWITCHING TIME: T(SECONDS)
FIRST SPEED v1(ppm)
SECOND SPEED v2(ppm)
BREAK-EVEN SHEET NUMBER x(SHEETS)

FIG. 10B

| ID | MFP MODEL NAME | BREAK-EVEN SHEET NUMBER |
|---|---|---|
| 01 | MFP MODEL A | 200 SHEETS |
| 02 | MFP MODEL B | 236 SHEETS |
| 03 | MFP MODEL C | 250 |
| ... | ... | ... |

FIG. 10C

| ID | MFP MODEL NAME | SPEED SWITCHING TIME (SECONDS) | FIRST SPEED(ppm) | SECOND SPEED(ppm) |
|---|---|---|---|---|
| 01 | MFP MODEL A | i | l | p |
| 02 | MFP MODEL B | 30 | 135 | 105 |
| 03 | MFP MODEL C | j | m | q |
| ... | ... | ... | ... | ... |

| FIRST PRINT SPEED | 135 SHEETS/MINUTE |
| SECOND PRINT SPEED | 105 SHEETS/MINUTE |
| SWITCHING TIME | 30 SECONDS |
| JOB NUMBER OF PAGES | 1300 PAGES |
| JOB DATA | FIG. 8A, FIG. 8B |

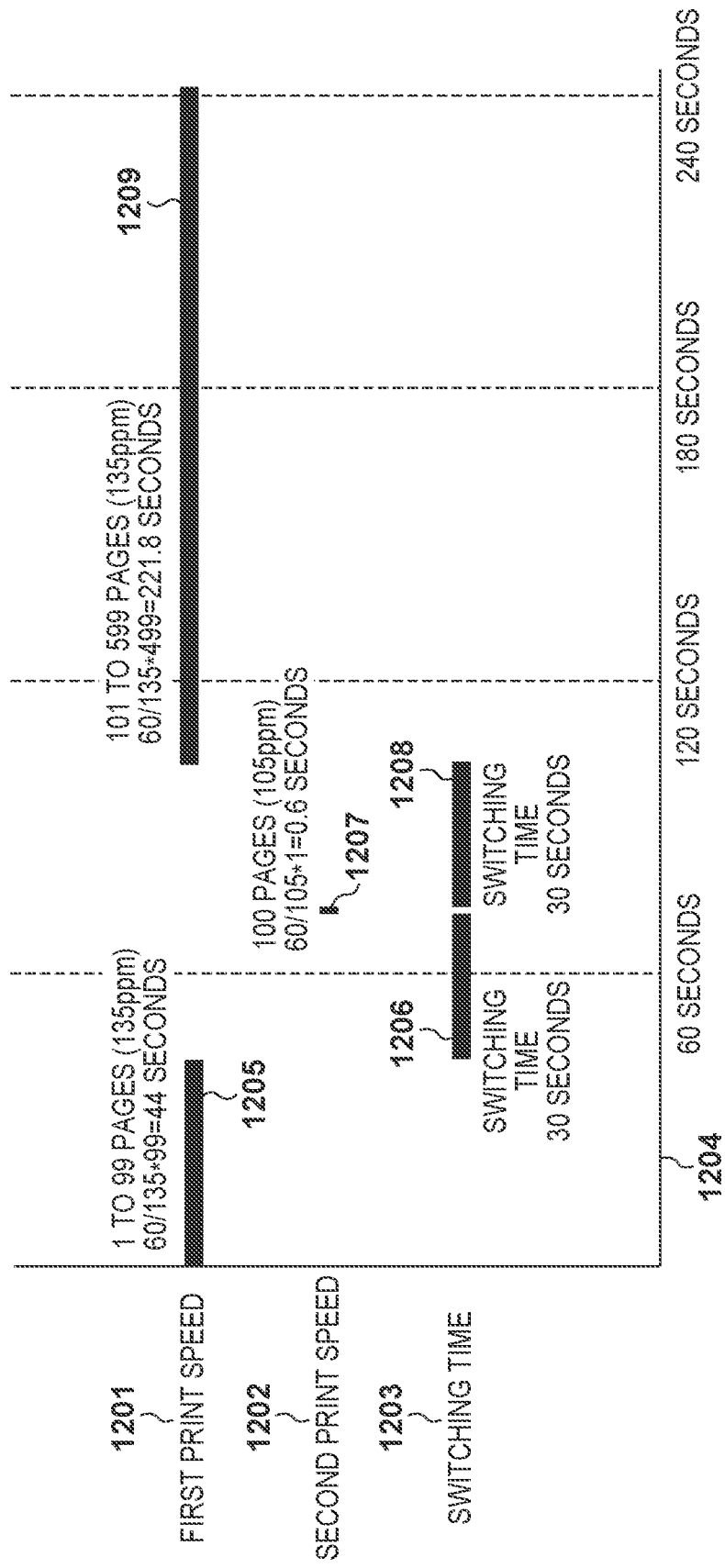

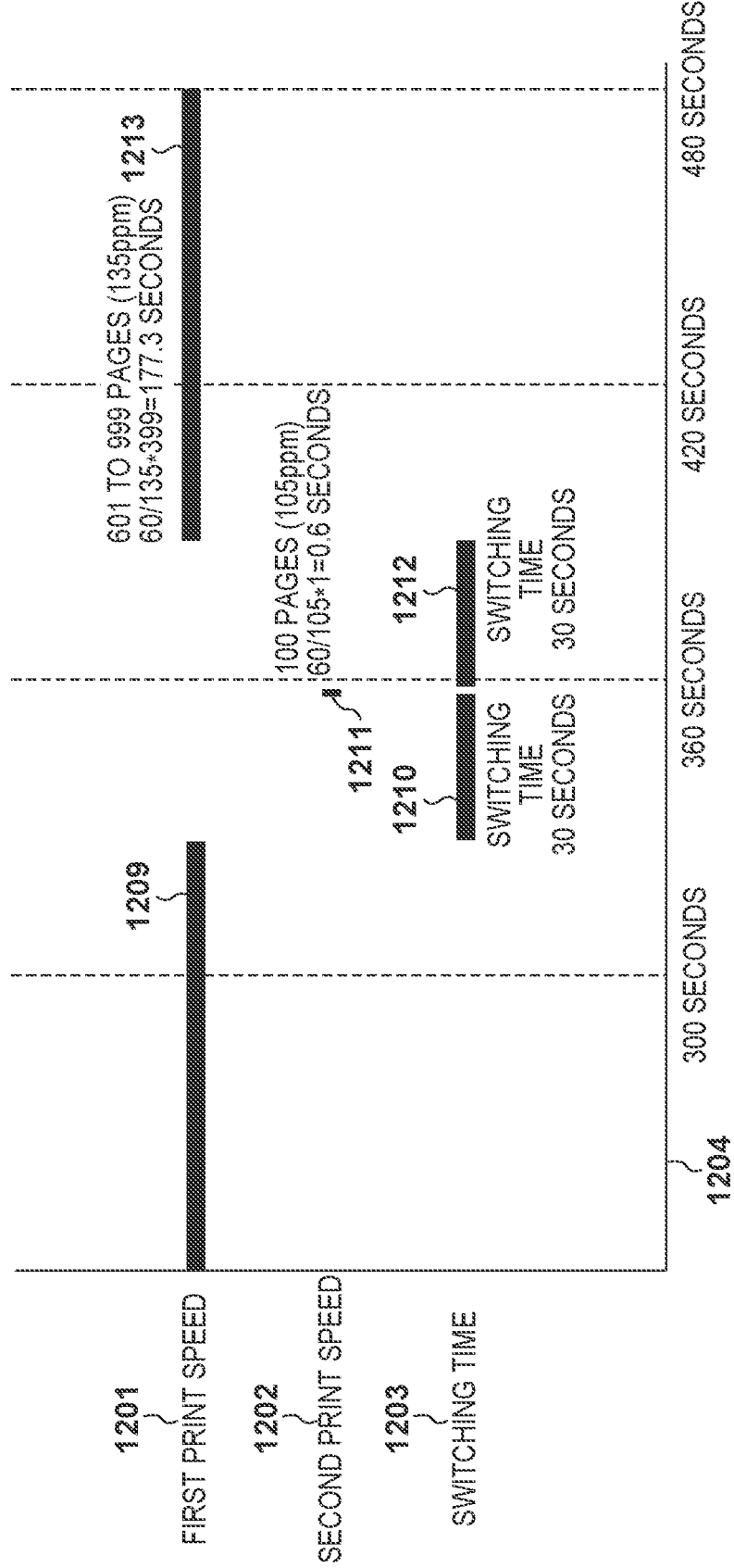

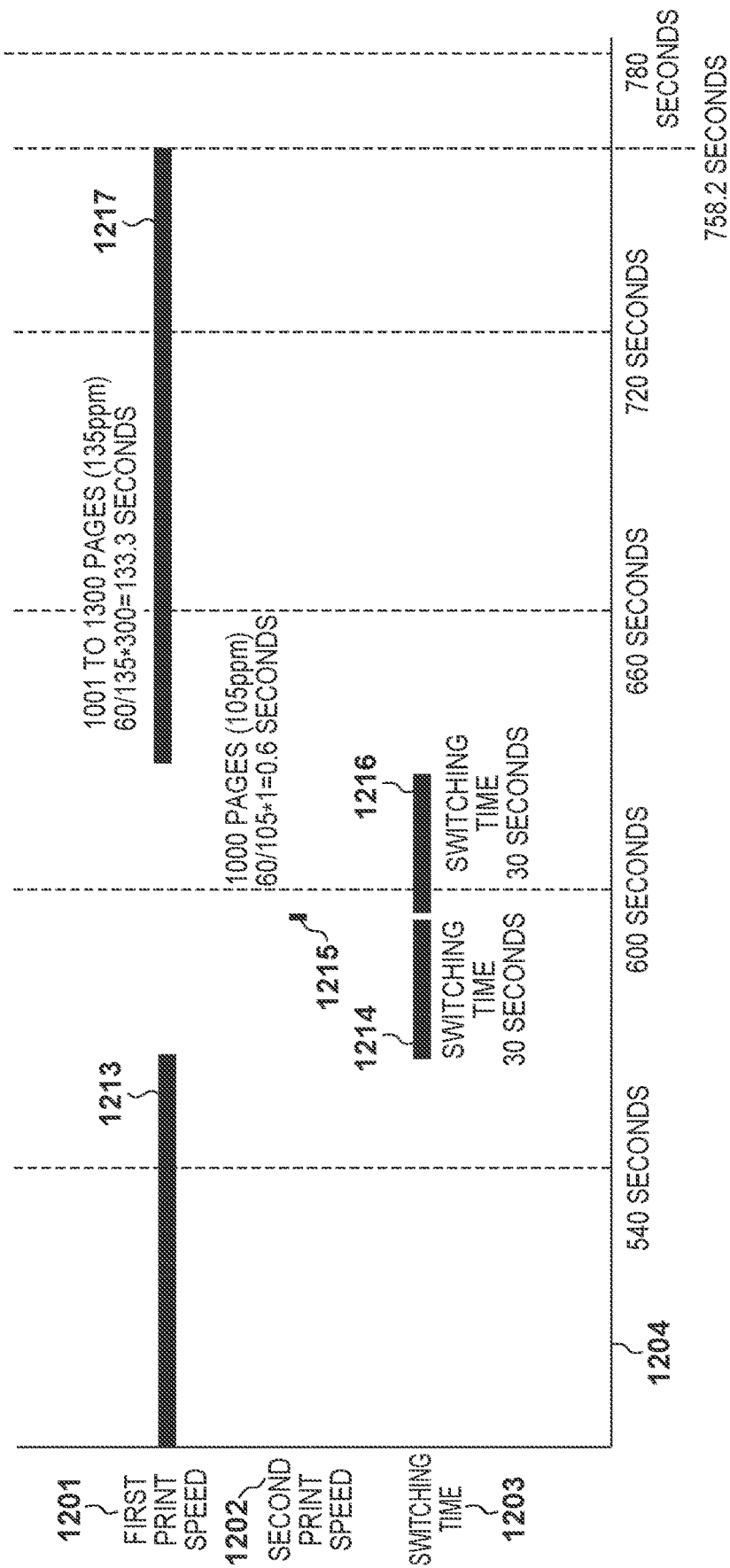

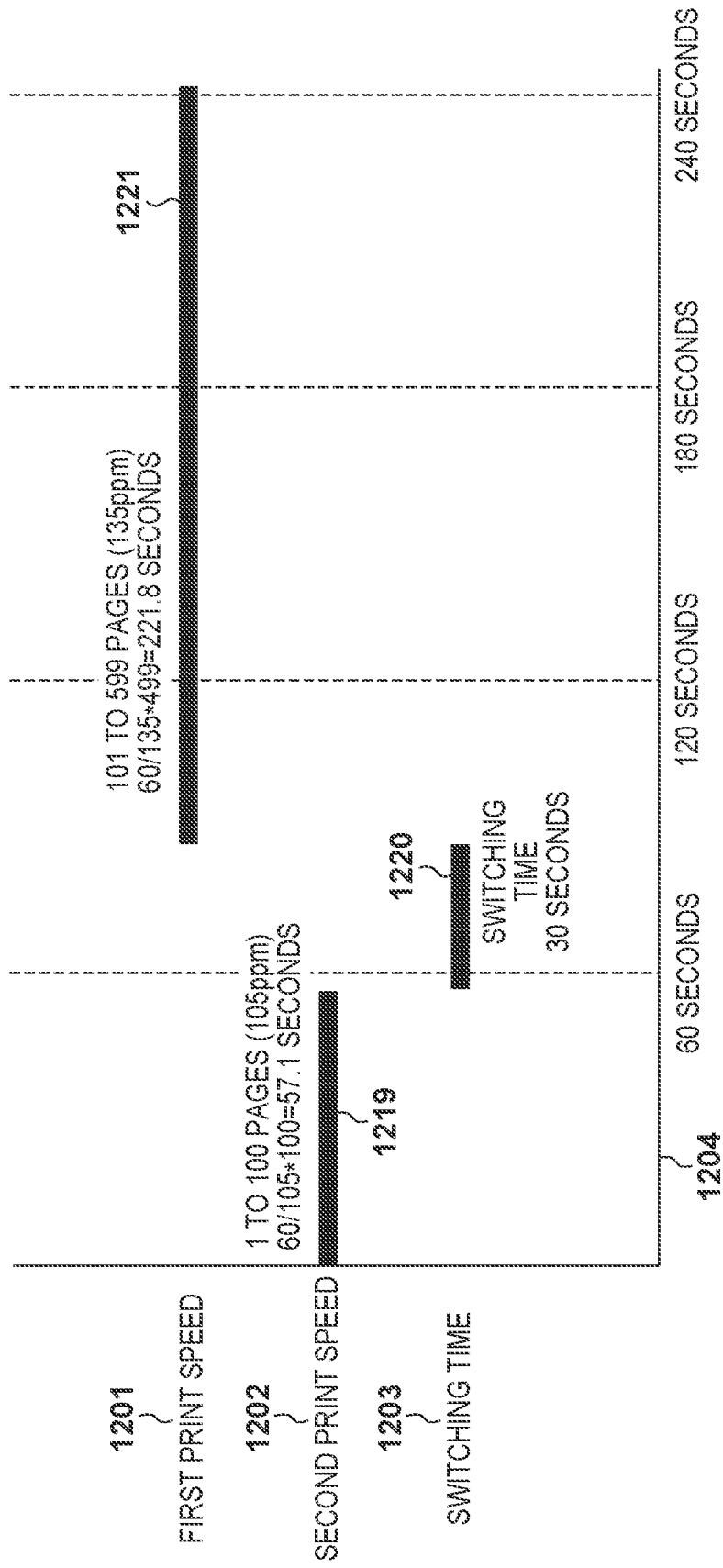

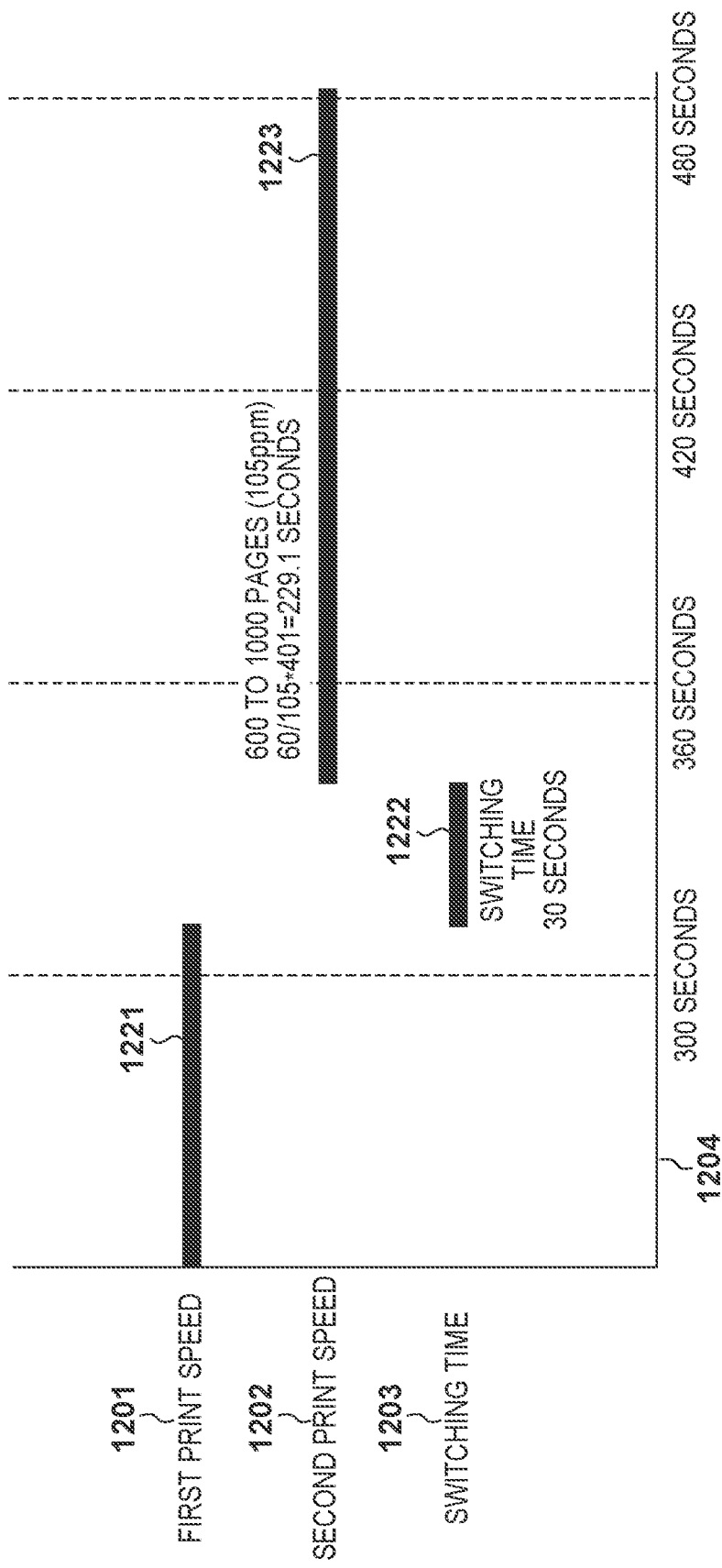

F I G. 14A
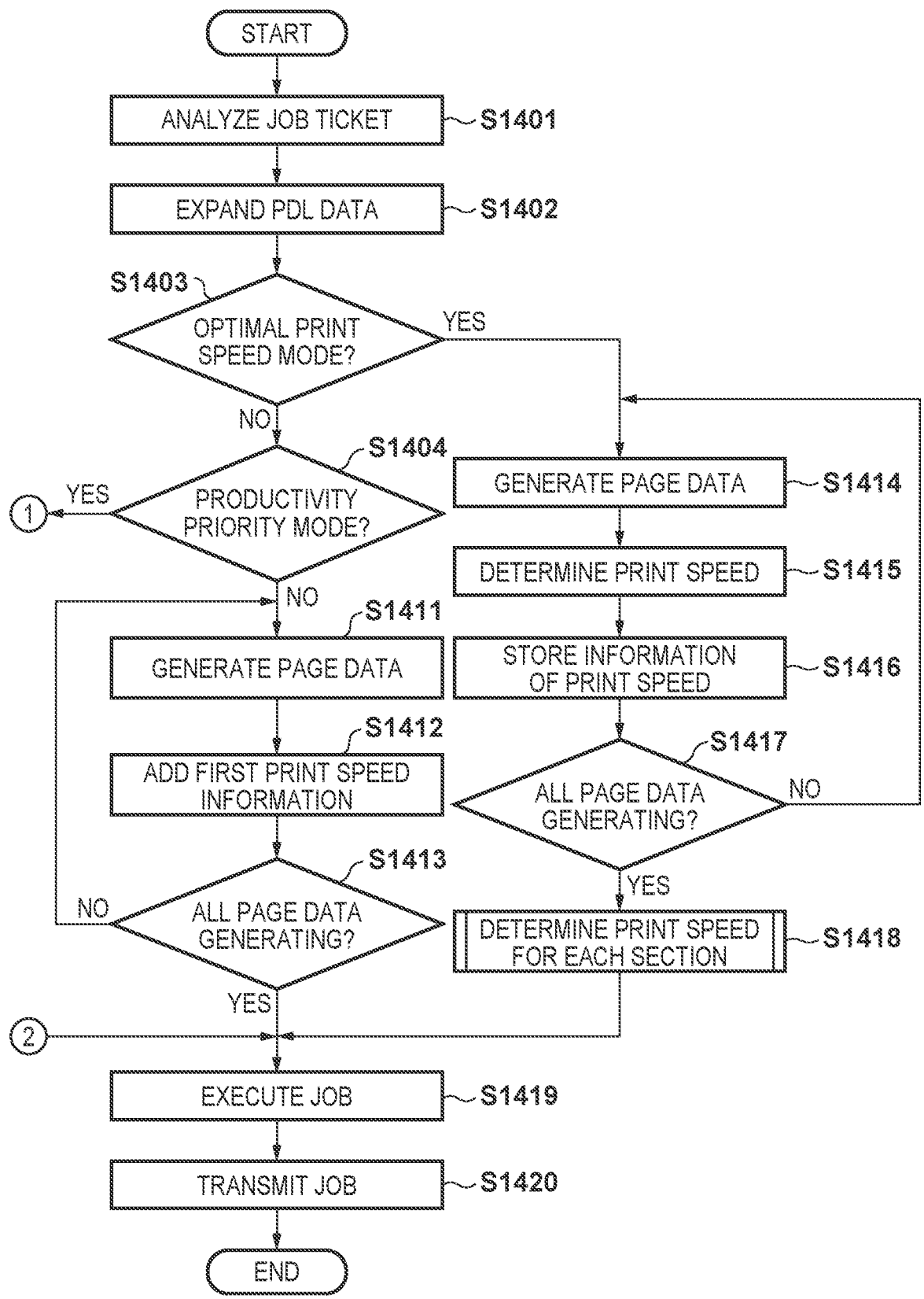

INFORMATION PROCESSING APPARATUS, IMAGE FORMING SYSTEM, METHOD, AND NON- TRANSITORY COMPUTER-READABLE STORAGE MEDIUM

BACKGROUND OF THE INVENTION

Field of the Invention

The present invention relates to an information processing apparatus, an image forming system, a method, and a non-transitory computer-readable storage medium.

Description of the Related Art

Conventional image forming apparatuses (e.g., multifunction peripherals) have had different print speed modes for each type of sheet (print paper). For example, when printing (recording) an image onto plain paper, the image forming apparatus prints in a high-speed printing mode. On the other hand, when printing (recording) an image onto heavy paper, coated paper, or the like, the image forming apparatus prints in a low-speed printing mode.

A method for controlling the print speed in accordance with the number of pages by setting the driving speed of a fixing unit to be variable in order to ensure uniformity in the print quality has been disclosed (Japanese Patent Laid-Open No. 2006-251441).

SUMMARY OF THE INVENTION

According to the present invention, an information processing apparatus that suppresses a drop in the productivity of printing by taking into account a switching time for the print speed, even when printing based on a print job in which the sheets of different types are intermixed, can be provided.

The present invention in its aspect provides an information processing apparatus comprising at least one processor, and at least one memory coupled to the at least one processor, the memory storing instructions that, when executed by the processor, cause the processor to act as an obtaining unit configured to obtain a job including a plurality of pages, a determining unit configured to determine a page group constituted by consecutive sheets of a same sheet type, from the plurality of pages included in the job obtained by the obtaining unit, and a setting unit configured to set a transport speed of sheets in the page group determined by the determining unit, wherein from the plurality of pages, the determining unit specifies a first page group constituted by consecutive sheets of a first sheet type, and a second page group that is adjacent to the first page group and that is constituted by consecutive sheets of a second sheet type different from the first sheet type, and when a first transport speed corresponding to the first sheet type is faster than a second transport speed corresponding to the second sheet type, and a number of pages in the first page group is less than a specified number of pages, the setting unit sets the second transport speed for the first page group and the second page group, and when the first transport speed corresponding to the first sheet type is faster than the second transport speed corresponding to the second sheet type, and the number of pages in the first page group is greater than the specified number, the setting unit sets the first transport speed for the first page group and the second transport speed for the second page group.

The present invention in its one aspect provides a method comprising obtaining a job including a plurality of pages, determining a page group constituted by consecutive sheets of a same sheet type, from the plurality of pages included in the job obtained by the obtaining, and setting a transport speed of sheets in the page group determined by the determining, wherein from the plurality of pages, the determining specifies a first page group constituted by consecutive sheets of a first sheet type, and a second page group that is adjacent to the first page group and that is constituted by consecutive sheets of a second sheet type different from the first sheet type, and when a first transport speed corresponding to the first sheet type is faster than a second transport speed corresponding to the second sheet type, and a number of pages in the first page group is less than a specified number of pages, the setting sets the second transport speed for the first page group and the second page group, and when the first transport speed corresponding to the first sheet type is faster than the second transport speed corresponding to the second sheet type, and the number of pages in the first page group is greater than the specified number, the setting sets the first transport speed for the first page group and the second transport speed for the second page group.

The present invention in its one aspect provides a non-transitory computer-readable storage medium storing instructions that, when executed by a computer, cause the computer to perform a method comprising obtaining a job including a plurality of pages, determining a page group constituted by consecutive sheets of a same sheet type, from the plurality of pages included in the job obtained by the obtaining, and setting a transport speed of sheets in the page group determined by the determining, wherein from the plurality of pages, the determining specifies a first page group constituted by consecutive sheets of a first sheet type, and a second page group that is adjacent to the first page group and that is constituted by consecutive sheets of a second sheet type different from the first sheet type, and when a first transport speed corresponding to the first sheet type is faster than a second transport speed corresponding to the second sheet type, and a number of pages in the first page group is less than a specified number of pages, the setting sets the second transport speed for the first page group and the second page group, and when the first transport speed corresponding to the first sheet type is faster than the second transport speed corresponding to the second sheet type, and the number of pages in the first page group is greater than the specified number, the setting sets the first transport speed for the first page group and the second transport speed for the second page group.

Further features of the present invention will become apparent from the following description of exemplary embodiments (with reference to the attached drawings).

BRIEF DESCRIPTION OF THE DRAWINGS

FIG. 4 is a diagram illustrating the software configuration of the image forming apparatus according to the first embodiment.

FIG. 5 is a diagram illustrating the software configuration of the DFE apparatus according to the first embodiment.

FIG. 6 is a diagram illustrating an example of sheet management information according to the first embodiment.

FIG. 7A is a diagram illustrating a basic screen in a display apparatus 105 attached to a DFE 103.

FIG. 7B is a diagram illustrating setting items that transition after a productivity priority mode selection part 702 has been selected in FIG. 7A.

FIG. 8B is a diagram illustrating sheet information for each page used when printing.

FIG. 10B is a diagram illustrating a table expressing relationships between each of MFP models and break-even sheet numbers.

FIG. 10C is a diagram illustrating a table expressing relationships between each of MFP models and performances thereof.

FIG. 12B is a diagram illustrating a time required for conventional printing processing.

FIG. 12C is a diagram illustrating a time required for conventional printing processing.

FIG. 12D is a diagram illustrating a time required for conventional printing processing.

FIG. 12E is a diagram illustrating a time required for printing processing according to the first embodiment.

FIG. 12F is a diagram illustrating a time required for printing processing according to the first embodiment.

FIGS. 14A to 14B is a flowchart illustrating processing performed by the DFE apparatus according to the first embodiment.

DESCRIPTION OF THE EMBODIMENTS

Figure 1:
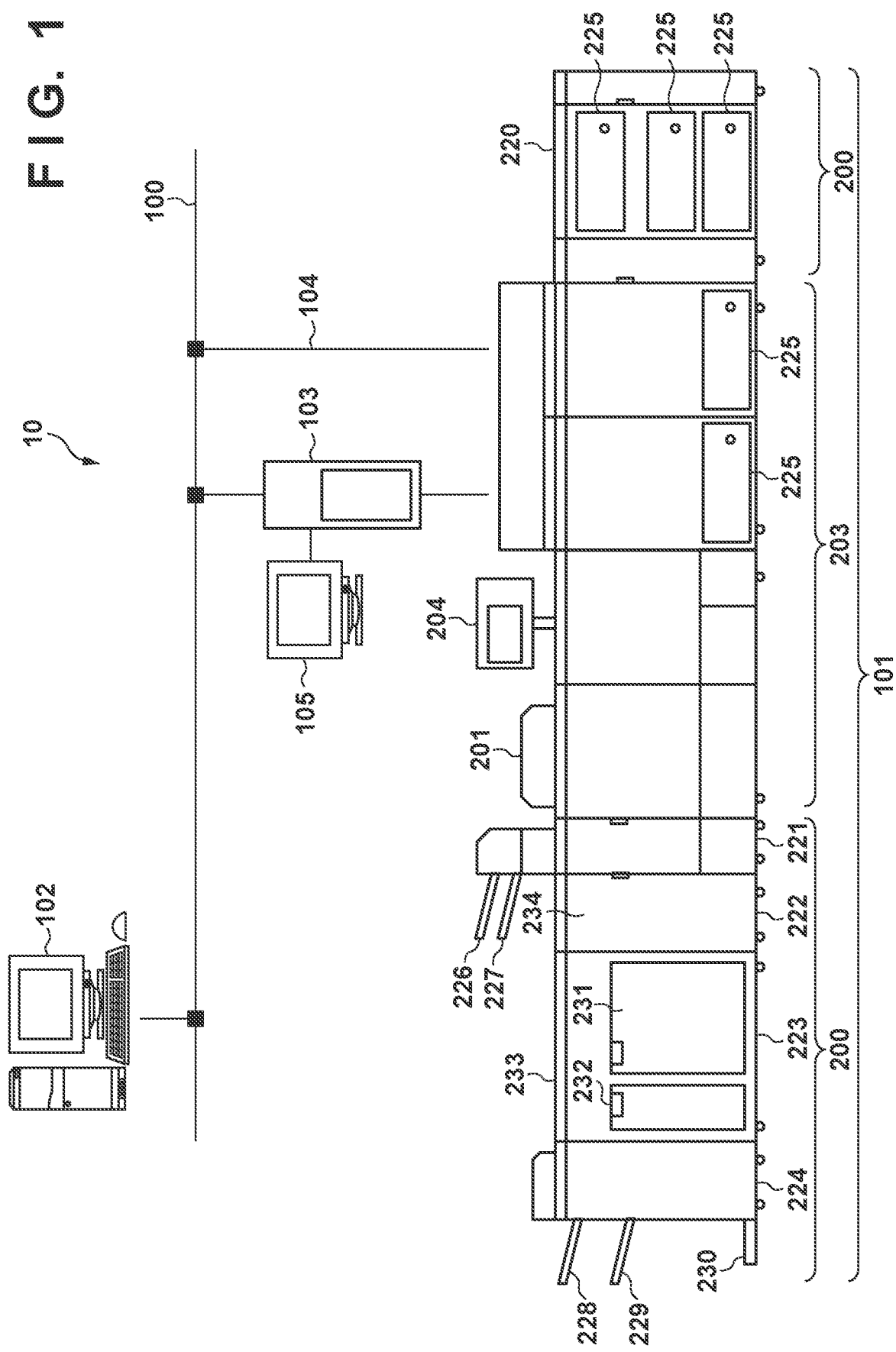
FIG. 1 is a diagram illustrating a printing system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a diagram illustrating a printing system according to a first embodiment.

Printing System

A printing system 10 is a system that records (prints) an image onto a medium based on a print job, and includes a network 100, an image forming apparatus 101, and an information processing apparatus 102. The image forming apparatus 101 and the information processing apparatus 102 are communicatively connected over the network 100.

Although FIG. 1 illustrates an example in which a single information processing apparatus 102 is provided in the printing system 10, the configuration is not limited thereto. For example, the image forming apparatus 101 and a plurality of information processing apparatuses 102 may be communicatively connected over the network 100.

Additionally, although the printing system 10 is illustrated as including the image forming apparatus 101 and the information processing apparatus 102, the configuration is not limited thereto. For example, the printing system 10 may include only the image forming apparatus 101. Furthermore, when executing image forming processing that can be executed by the image forming apparatus 101 alone, e.g., when printing a copy job or a saved job, the printing system 10 need not include the information processing apparatus 102.

The image forming apparatus 101 is an apparatus that forms an image onto a sheet (a medium), and is, for example, a multifunction peripheral. The image forming apparatus 101 also has a reading function for reading sheets onto which images have been formed, and a printing function for printing images onto sheets. The image forming apparatus 101 also has a function for binding a plurality of sheets onto which images have been printed, a function for aligning a plurality of sheets, and a function for discharging a plurality of sheets to a corresponding plurality of trays. Here, "sheet" includes, for example, plain paper, heavy paper, coated paper, and film. Note that the image forming apparatus 101 need not include the reading function.

The information processing apparatus 102 is an apparatus that processes various types of information in the printing system 10, and includes a PC, for example. Note that the information processing apparatus 102 may be a mobile information terminal, such as a smartphone or a tablet terminal, for example. The information processing apparatus 102 executes various types of programs, such as an application program that loads print jobs into the image forming apparatus 101.

The information processing apparatus 102 includes a printer driver having a function for converting print data into a printer language corresponding to the image forming apparatus 101, as well as various types of applications such as workflow software. Accordingly, a user can issue a printing instruction to the image forming apparatus 101 through the various types of applications.

Note that the method by which the information processing apparatus 102 transmits the print data to the image forming apparatus 101 may be changed as appropriate. For example, the information processing apparatus 102 may transmit the print data to the image forming apparatus 101 through a printing application or a driver. Alternatively, the information processing apparatus 102 may transmit the print data to the image forming apparatus 101 via a cloud server (not shown).

A DFE 103 is an apparatus that performs processing on print job data including a plurality of pages input to the image forming apparatus 101. "DFE" is an acronym for "Digital Front End". The DFE 103 performs, for example, correction and editing of print job data input from the information processing apparatus 102 or the like, high-speed Raster Image Processor (RIP) processing, storage and management of print job data, and the like. In this manner, the DFE 103 functions as a server device. Note that the information processing apparatus 102 may have the functionality of the DFE 103. In this case, the information processing apparatus 102 performs the processing from receiving the print job data.

The DFE 103 also includes a display apparatus 105 for inputting and outputting various types of data. In this case, the image forming apparatus 101 may be connected to the network 100 directly by a cable 104.

The units constituting the image forming apparatus 101 will be described next.

A printing unit 203 (corresponding to a "recording unit") forms (prints) an image using toner onto a sheet fed from a sheet feeding unit based on image data. The configuration and principles of operation of the printing unit 203 are as follows.

Light rays, such as from a laser beam, which have been modulated in accordance with the image data, are reflected by a rotating polygonal mirror or the like, and a photosensitive drum is irradiated with the resulting scanning light. An electrostatic latent image formed on the photosensitive drum by this laser beam is developed using toner, and the resulting toner image is transferred onto a sheet which adheres to a transfer drum. A full-color image is formed on the sheet by executing this sequence of image forming processes in order for yellow (Y), magenta (M), cyan (C), and black (K) toners. In addition to the four colors of YMCK, the configuration may be such that toner of special colors, transparent toner, and the like can be transferred as well. The sheet on the transfer drum, on which a full-color image has been formed in this manner, is transported to a fixing unit. The fixing unit includes rollers, belts, and the like, with heat sources such as halogen heaters built into the rollers, and the toner on the sheet onto which the toner image has been transferred is melted and fixed to the sheet using heat and pressure.

Here, the image forming apparatus 101 selects a print speed mode used when causing the printing unit 203 to print an image onto a sheet based on the type of sheet used in the printing. For example, the fixing processing is affected by the type of the sheet, the basis weight, and the like, and it is therefore necessary for the image forming apparatus 101 to perform print speed mode switching processing according to the type of sheet and the basis weight.

"Fixing process" refers to processing for applying heat to the toner to fix the toner to a sheet. "Basis weight" refers to the weight of the sheet (e.g., paper), expressed as "$g/m^2$". As described at the beginning of the present specification, the print speed mode switching processing requires a certain amount of time, and thus a time loss may occur each time the print speed mode is switched.

The printing unit 203 includes a scanner 201 and an operation unit 204. The operation unit 204 is disposed on a top surface of the printing unit 203.

The operation unit 204 provides a graphical user interface (GUI) when the user makes various types of settings and operations for the printing unit 203.

A high-capacity sheet feed apparatus 220 is a paper feed apparatus that can be attached to and detached from the printing unit 203. The high-capacity sheet feed apparatus 220 includes a plurality of sheet feeding units 225. The printing unit 203 can then print onto a large number of sheets (e.g., paper) transported from the high-capacity sheet feed apparatus 220.

An inserter 221 is an apparatus used when inserting a sheet not involved in image formation into a printed product constituted by sheets on which images have been formed by the printing unit 203. The inserter 221 includes a tray 226 and a tray 227.

A punching apparatus 222 is an apparatus that performs processing such as punching holes in a sheet supplied by the printing unit 203 or the inserter 221. The punching apparatus 222 includes a die as a replaceable component therein. A door 234 is a member that can be opened and closed to replace the die. For example, when replacing the die, the user opens the door 234 and replaces the die in the punching apparatus 222.

A binding apparatus 223 is an apparatus for performing binding processing to produce a printed product. For example, for a printed product in which holes have been punched by the punching apparatus 222, the binding apparatus 223 passes binding members through the holes in the printed product and then deforms the binding members. A bundle of printed products, i.e., a book-binding product, is obtained as a result.

The book-binding product is stacked on a tray disposed inside a binding door 231. Additionally, the image forming apparatus 101 includes a door 232 configured to be openable/closeable when refilling the binding members. Furthermore, the image forming apparatus 101 includes a door 233 that enables access to a sheet transport path within the image forming apparatus 101 when a paper jam or the like occurs, for example.

A processing apparatus 224 is an apparatus provided for applying a stapling process to a bundle of a plurality of sheets. The type of stapling includes binding processing in a format desired by the user, such as corner stapling, two-position stapling, saddle stapling, and the like, for example. The printed product that has undergone the stapling process is discharged to a tray 228 or a tray 229 in the case of corner stapling or two-position stapling. On the other hand, a printed product that has undergone saddle stapling is discharged to a tray 230.

The image forming apparatus 101 has three parts, with the printing unit 203 serving as a boundary. In FIG. 1, the device disposed to the right of the printing unit 203 is called a "sheet feeding device". The sheet feeding device continuously supplies sheets loaded inside the high-capacity sheet feed apparatus 220 to the printing unit 203 at an appropriate timing. In addition, the sheet feeding device detects the remaining number of sheets loaded inside the high-capacity sheet feed apparatus 220. Note that the sheet feeding units 225 are also present within the printing unit 203, and the sheet feeding units 225 have functions equivalent to those of the sheet feeding device. The sheet feeding units 225 provided in the printing unit 203 will also be called "sheet feeding devices".

On the other hand, the devices disposed to the left of the printing unit 203 are called a "sheet processing device". The sheet processing device may also be called a "post-processing device". The sheet processing device performs various processing on the sheet for which the printing processing is complete, or collects the sheet. A sheet processing apparatus 200 includes the sheet feeding device and the sheet processing device.

Figure 2:
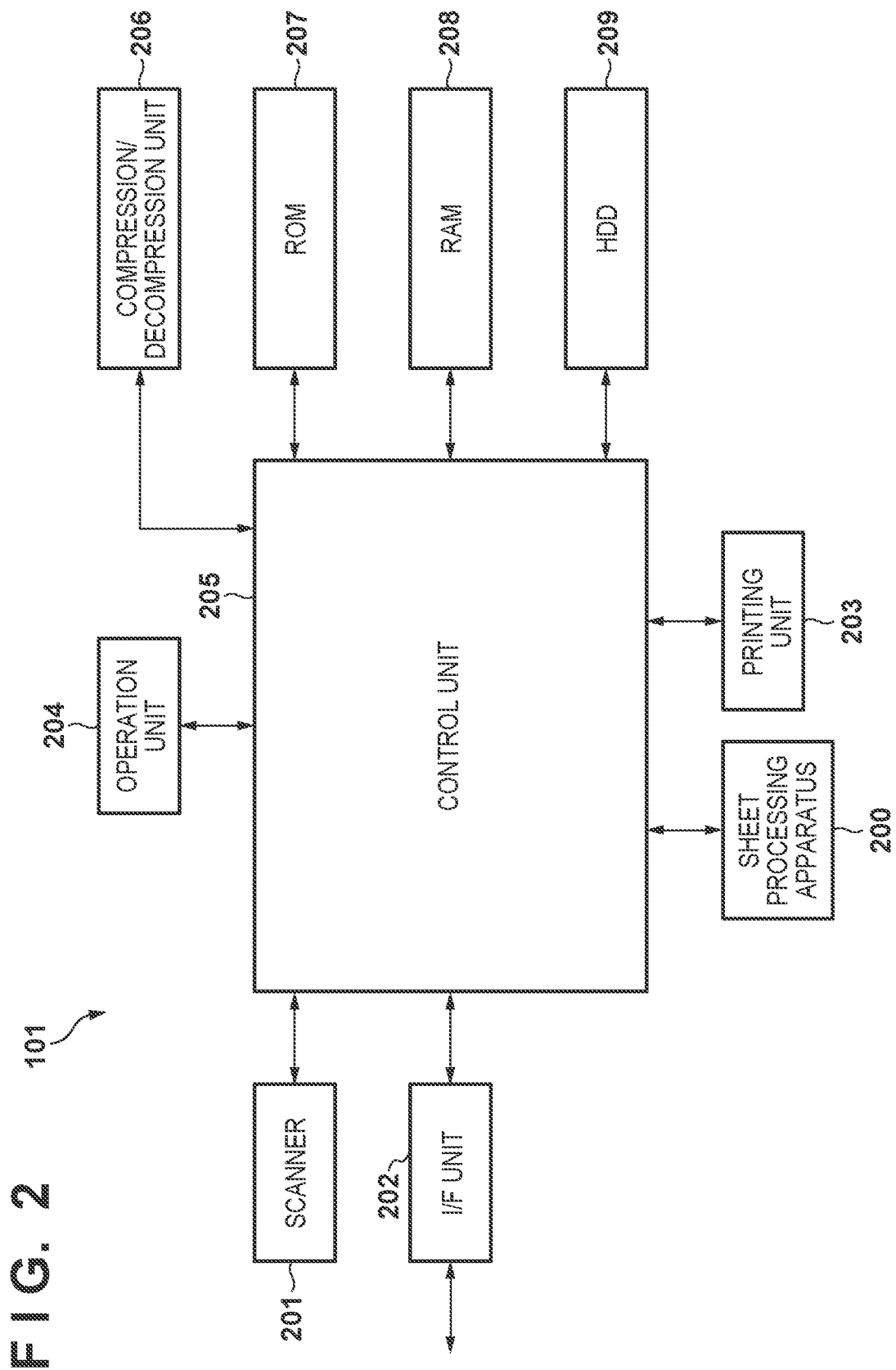
FIG. 2 is a diagram illustrating the hardware configuration of an image forming apparatus according to the first embodiment.

FIG. 2 is a diagram illustrating the hardware configuration of the image forming apparatus according to the first embodiment. Note that the blocks illustrated in FIG. 2 are divided into units that constitute the printing system 10, and thus there are parts that do not necessarily correspond to the units of the device configuration illustrated in FIG. 1.

The image forming apparatus 101 includes a non-volatile memory such as an HDD 209 or the like that can store data of a plurality of jobs to be processed therewithin. "HDD" is an acronym for "Hard Disk Drive". Although the image forming apparatus 101 including the HDD 209 is described as an example in the present embodiment, it should be noted that the configuration is not limited thereto. For example, the image forming apparatus 101 may include a high-capacity, non-volatile storage apparatus similar to the HDD 209.

The image forming apparatus 101 stores data received from the scanner 201 in the HDD 209. The image forming apparatus 101 has a copy function that, based on the data received from the HDD 209, causes the printing unit 203 to print the image contained in the received data. Furthermore, the image forming apparatus 101 stores the received job data in the HDD 209 via an I/F unit 202, which is an example of a communication unit, from an external apparatus (not shown). The image forming apparatus 101 has a printing function that causes the printing unit 203 to print an image onto a sheet by reading out job data from the HDD 209 and executing the job. In this manner, the image forming apparatus 101 is a multifunction peripheral (MFP) having a plurality of functions. Note that the image forming apparatus 101 can perform both color printing and black-and-white printing when printing on a sheet.

The scanner 201 is an apparatus capable of reading a document, and outputs image data obtained by reading the document as image processing.

The I/F unit 202 exchanges image data and the like with a facsimile machine, a network-connected device, and the external apparatus (not shown).

The HDD 209 stores various types of management information and the like that are permanently stored, changed, and managed by the image forming apparatus 101. The image forming apparatus 101 includes the printing unit 203 that executes printing processing for the job data to be printed in the HDD 209.

The operation unit 204 includes a display unit (e.g., a liquid crystal screen) that accepts operation inputs from a user.

A control unit 205 includes a CPU (not shown) and comprehensively controls processing, operations, and the like performed by each unit in the image forming apparatus 101.

A ROM 207 includes programs executed by the control unit 205 for implementing various types of processing and the like in the flowcharts described later. The ROM 207 also stores various types of control programs necessary in the present embodiment. The ROM 207 also stores a display control program and the like for displaying user interface screens (called "UI screens" hereinafter) in the display unit of the operation unit 204.

The CPU of the control unit 205 implements various types of operations performed by the image forming apparatus 101 by reading out programs stored in the ROM 207 and executing the programs. In addition, the control unit 205 interprets page description language ("PDL" hereinafter) data received via the OF unit 202 and expands the data into raster image data (bitmap image data). The ROM 207 also stores programs and the like that execute the above-described operations performed by the control unit 205.

The ROM 207 also stores programs for interpreting and processing print jobs received by the control unit 205 via the I/F unit 202. The ROM 207 is a read-only memory that stores programs such as boot sequences and font information in advance. The various types of programs stored in the ROM 207 will be described in detail later.

A RAM 208 is a readable and writable memory, and stores image data, various types of programs, configuration information, and the like transmitted from the scanner 201 or the I/F unit 202.

The control unit 205 also controls the operations of the sheet processing apparatus 200. The sheet processing apparatus 200 corresponds to the sheet feeding device and the sheet processing device illustrated in FIG. 1.

The HDD 209 stores image data compressed by a compression/decompression unit 206. The HDD 209 is configured so as to be capable of holding a plurality of instances of job data and the like to be processed.

The control unit 205 stores the job data to be processed, input via the scanner 201 or the I/F unit 202, in the HDD 209. Then, the control unit 205 reads out the job data from the HDD 209 and executes the job, and the printing unit 203 prints a predetermined image on a sheet as a result.

Additionally, the control unit 205 transmits the job data read out from the HDD 209 to an external apparatus (not shown) via the I/F unit 202. The control unit 205 executes various types of processing on the job data to be processed in the HDD 209.

The compression/decompression unit 206 compresses or decompresses image data or the like in RAM 208 and the HDD 209 using various types of compression methods such as JBIG, JPEG, or the like.

Figure 3:
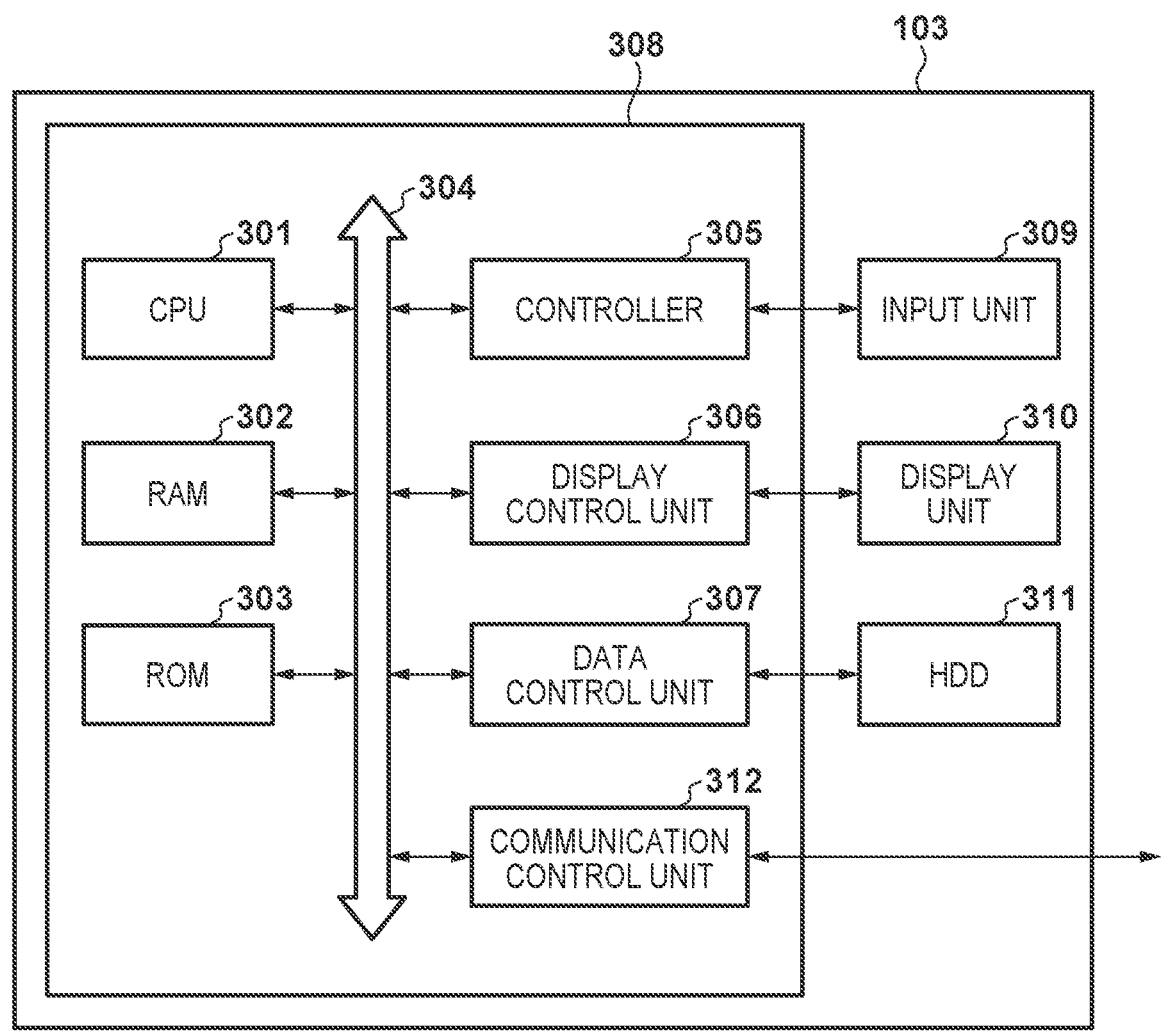
FIG. 3 is a diagram illustrating the hardware configuration of DFE apparatus according to the first embodiment.

FIG. 3 is a diagram illustrating the hardware configuration of a DFE apparatus according to the first embodiment.

A CPU 301 executes programs, such as an OS, general-purpose applications, binding applications, and the like that are stored in a ROM 303 or loaded into a RAM 302 from an HDD 311.

The ROM 303 stores various types of data, such as font data.

The RAM 302 functions as main memory, a work area, and the like for the CPU 301.

A controller 305 controls inputs from an input unit 309 and a pointing device (not shown).

A display control unit 306 controls displays in the display unit 310.

A data control unit 307 controls access to the HDD 311 and the like that store a boot program, various types of applications, font data, user files, and the like.

A communication control unit 312 is connected to the network 100, and controls communication with an external apparatus (not shown) connected to the network 100.

A bus 304 connects the CPU 301, the RAM 302, the ROM 303, the controller 305, the display control unit 306, the data control unit 307, and the communication control unit 312, and carries data signals and control signals among those respective units.

FIG. 4 is a diagram illustrating the software configuration of the image forming apparatus according to the first embodiment.

Various types of programs are stored in the ROM 207. The control unit 205 of the image forming apparatus 101 reads out and executes the various types of programs.

A boot loader 401 is a program that is executed immediately after the power of the image forming apparatus 101 is turned on. The boot loader 401 includes programs for executing various types of startup sequences required to start up the system.

An operating system 402 is a program for providing an execution environment for various types of programs that implement the functions of the image forming apparatus 101. The operating system 402 provides functions such as managing the memory of the image forming apparatus 101, i.e., the ROM 207, the RAM 208, the HDD 209, and the like, basic input/output control of the various units illustrated in FIG. 2, and the like.

A network control program 403 is a program that is executed when sending and receiving data to an external apparatus connected over the network 100. The network control program 403 is used for processing for receiving files to be printed, transmitting data from external apparatuses, and sending and receiving commands. The network control program 403 also includes a device driver program for controlling the I/F unit 202.

A JDF function program 404 (JDF: Job Definition Format) is a program that executes a JDF print function executed by the control unit 205 when JDF job data is received by the image forming apparatus 101 via the I/F unit 202. In the JDF print function, the control unit 205 sequentially controls the operations of the devices illustrated in FIG. 2 based on a processing sequence and processing conditions described in the program. Ultimately, the control unit 205 controls JDF printing processing to be executed.

The devices include the sheet processing apparatus 200, the printing unit 203, the HDD 209, the compression/decompression unit 206, the RAM 208, and the like. Program processing such as processing for analyzing the JDF job data, processing for determining whether incorrect settings are included in the JDF job data, changing settings to eliminate the incorrect settings, and the like are included as well.

A PDL function program 405 is a program that, when the image forming apparatus 101 receives PDL data (image data), executes PDL data expansion processing executed by the control unit 205, and also executes a printing function. In the PDL function performed by the control unit 205, the control unit 205 sequentially controls the operations of the devices illustrated in FIG. 2 in an appropriate order based on a processing sequence and processing conditions described in the program. The PDL printing processing is ultimately executed as a result. The devices include the sheet processing apparatus 200, the printing unit 203, the HDD 209, the compression/decompression unit 206, the RAM 208, and the like. In addition, the PDL function program 405 is configured to operate together with a sheet management program 406 as an analysis unit for various types of job setting formats when executing the printing processing.

The sheet management program 406 is a program for executing a management function related to the sheets which can be used by the image forming apparatus 101. Sheet-related information managed by the sheet management program 406 is stored in the HDD 209. The sheet management program 406 provides sheet management functions such as registering new sheets and deleting unneeded sheets. The sheet management program 406 also has a function for changing the settings of registered sheets, adjusting unadjusted sheets, re-registering adjusted sheets, and the like. Furthermore, the sheet management program 406 exports sheet information to the exterior of the image forming apparatus 101, such as the information processing apparatus 102, for example, via the I/F unit 202. Alternatively, the sheet management program 406 also has management functions such as importing sheet information from the information processing apparatus 102. As the sheet-related information managed by the sheet management program 406, print speed information and sheet information at the time of printing are managed in association with each other.

The JDF function program 404 and the PDL function program 405 are configured to determine the type of sheet used in the print job, the print conditions, and the like, and to select and control an appropriate print speed, in tandem with the sheet management program 406. The selection and control of the print speed will be described in greater detail later.

A settings management program 407 is a program that makes various types of settings for the image forming apparatus 101. The settings management program 407 is executed through the operation unit 204, or is executed through the I/F unit 202, or is executed remotely from an external apparatus, such as the information processing apparatus 102, the DFE 103, or the like.

Other programs 408 collectively refers to programs, stored in the ROM 207 and executable by the image forming apparatus 101, that are not included in any of the programs described above. The other programs 408 are not important in describing the effects of the present invention, and will therefore not be described here.

FIG. 5 is a diagram illustrating the software configuration of the DFE apparatus according to the first embodiment.

A boot loader 501 is a program that is executed immediately after the power of the DFE 103 is turned on. The boot loader 501 includes programs for executing various types of startup sequences required to start up the system.

An operating system 502 is a program for providing an execution environment for various types of programs that implement the functions of the DFE 103. The operating system 502 provides management functions for the memory of the DFE 103, i.e., the ROM 303, the RAM 302, the HDD 311, and the like.

A network control program 503 is a program that is executed when sending and receiving data to an external apparatus connected over the network 100. In other words, the network control program 503 is used when transmitting print job data to the image forming apparatus 101 and instructing printing processing to be performed. The network control program 503 is also used for receiving printing data from the information processing apparatus 102, transmitting statuses, and the like.

A job management program 504 is a program for managing jobs transmitted by the DFE 103 to the image forming apparatus 101. The job management program 504 manages a job list in the order of transmission, rearranges the order of the jobs, and executes processing such as pausing/canceling, jobs and changing settings, and the like. Additionally, when a print job has been received by the DFE 103 from the information processing apparatus 102 or the like, the job management program 504 works in tandem with a PDL function program 506, a scheduler program 507, a Pre-RIP program 505, and the like, which will be described later. The job management program 504 causes the DFE 103 to perform a series of job management and job execution control processing.

The Pre-RIP program 505 is a program that analyzes print job data when the DFE 103 has received print job data from the information processing apparatus 102 via the network control program 503. The Pre-RIP program 505 transmits a number of pages and a page size of the print job data, page-by-page sheet information, various types of settings information, and the like to the job management program 504.

The PDL function program 506 is used to perform processing for expanding the print job data, which is executed when the DFE 103 receives the print job data from the information processing apparatus 102 via the network control program 503. The expanded data is converted into a format suitable for printing and is transmitted to the image forming apparatus 101 via the network control program 503.

Through this, the PDL function program 506 instructs the image forming apparatus 101 to execute the printing processing.

The scheduler program 507 presents information pertaining to the progress of each job registered in the job management program 504. The scheduler program 507 displays the time required for the job and the time at which the sheets will run out and the like in chronological order in the display unit 310. Through this, the user using the image forming apparatus 101 and the DFE 103 can efficiently refill the sheets and print a product according to a production plan.

Other programs 508 collectively refers to programs that are included in the DFE 103 but are not included in any of the above-described programs. The other programs 508 are not important in describing the effects of the present invention, and will therefore not be described here.

FIG. 6 is a diagram illustrating an example of the sheet management information according to the first embodiment.

FIG. 6 is a diagram illustrating the configuration of sheet database information managed by the sheet management program 406 illustrated in FIG. 4 and stored in the HDD 209. The sheet database information will be described hereinafter.

An ID field 601 is an internal ID uniquely determined within the image forming apparatus 101 for all sheet entries stored in the sheet database.

In FIG. 6, a sheet name field 602, a sheet size field 603, a sheet type field 604, and a basis weight field 605 are managed as sheet-related parameters in the same sheet database.

A first print speed field 606 indicates whether one print speed can be used among a plurality of print speed modes provided in the image forming apparatus 101. A first print speed (corresponding to a "first transport speed") corresponds to a "high-speed printing mode" according to the present embodiment.

A second print speed field 607 indicates whether one print speed can be used among a plurality of print speed modes provided in the image forming apparatus 101. A second print speed (corresponding to a "second transport speed") corresponds to a "low-speed printing mode" according to the present embodiment.

Note that the information in the first print speed field 606 and the second print speed field 607 is provided as part of the product specifications by the provider (manufacturer) of the image forming apparatus 101. On the other hand, the editing and creation of the information in the first print speed field 606 and the second print speed field 607 may be performed by the user of the image forming apparatus 101.

Coated paper A, coated paper B, coated paper C, and coated paper X are displayed in the sheet name field 602. Coated paper A, coated paper B, coated paper C, and coated paper X have the same content with respect to the sheet size field 603 (A4), the sheet type field 604 (both sides coated), and the basis weight field 605 (200 g). However, only the sheet type field 604 of coated paper C is single side coated.

Because the information (or values) in the sheet size field 603 to the basis weight field 605 are the same, a conventional image forming apparatus 101 would print coated paper A to coated paper X at the same print speed.

The image forming apparatus 101 determines the states of the first print speed field 606 and the second print speed field 607 for coated paper A to coated paper X, respectively. FIG. 6 illustrates whether printing is possible (i.e., whether transport is possible) at the second print speed for all of coated paper A to coated paper X. For example, "yes" in the second print speed field 607 indicates that printing is possible, whereas "no" indicates that printing is not possible. FIG. 6 illustrates that coated paper A to coated paper C can be printed at the first print speed, but coated paper X cannot be printed at the first print speed.

FIG. 7A is a diagram illustrating a basic screen in the display apparatus 105 attached to the DFE 103. Note that the basic screen may be displayed in the operation unit 204 of the information processing apparatus 102 or the image forming apparatus 101 over the network 100.

A print quality setting part 701 is provided for setting the print quality of the image forming apparatus 101. The print quality setting part 701 instructs the setting management program 407 illustrated in FIG. 4 to be executed. A productivity priority mode selection part 702 is an item for selecting productivity settings, which will be described later.

FIG. 7B is a diagram illustrating setting items that transition after the productivity priority mode selection part 702 has been selected in FIG. 7A. The setting items are provided by a productivity setting part 703.

The screen transition from FIG. 7A to FIG. 7B is implemented by the display control unit 306. The data control unit 307 stores a result of executing processing for the various types of settings in the HDD 311 and transmits the processing result of the various types of settings to the image forming apparatus 101. The image forming apparatus 101 causes the control unit 205 to execute the settings management program 407 based on the received setting instructions. Then, the image forming apparatus 101 stores the results of the processing by the control unit 205 in the HDD 209.

A quality priority part 704 selects, for example, the slowest print speed mode among at least one print speed mode, as a method for selecting the print speed to be applied when performing printing processing on the sheet.

A productivity priority part 705 selects, for example, the fastest print speed mode among at least one print speed mode, as a method for selecting the print speed to be applied when performing printing processing on the sheet.

An optimal print speed part 706 selects the fastest print speed among the at least one print speed mode as a method for selecting the print speed mode to be applied when printing the sheet. At the same time, the optimal print speed part 706 determines, based on all the sheet information in the print job data, whether the overall processing time will be reduced if the print speed mode is switched. When it is determined that the overall processing time will not be shorter if the print speed mode is switched, the optimal print speed part 706 selects a slow print speed mode in order to suppress switching of the print speed mode. On the other hand, when it is determined that the overall processing time will be shortened if the print speed mode is switched, the optimal print speed part 706 selects a fast print speed mode.

The user selects one of the quality priority part 704, the productivity priority part 705, and the optimal print speed part 706, and when a confirmation part 707 is pressed, the setting of the selected print speed is confirmed. On the other hand, the user selects a cancel part 708 when the selected settings are to be canceled.

Operations of the DFE 103 when the quality priority part 704, the productivity priority part 705, and the optimal print speed part 706 are selected will be described hereinafter. Only control for determining the print speed will be mentioned, and other control will not be described.

When the quality priority part 704 is selected, the job management program 504 instructs the image forming apparatus 101 to print all the sheets at the second print speed (that is, low-speed printing) via the PDL function program 506.

When the productivity priority part 705 is selected, the Pre-RIP program 505 analyzes the print job data and collects information such as the number of pages to be printed, the page size, page-by-page information, and various types of settings information. The Pre-RIP program 505 transmits the collected information to the job management program 504.

The job management program 504 determines the sheets to be used for printing based on the analysis information (corresponding to an "analysis result") and the sheet database information obtained from the image forming apparatus 101 via the network control program 503.

Based on the information in the first print speed field 606 and the second print speed field 607, the DFE 103 determines the printable speed for each sheet. Here, the job management program 504 sets the jobs to be printed at the maximum speed at which each sheet can be printed. The job management program 504 instructs the image forming apparatus 101 of the print speed via the PDL function program 506.

When the optimal print speed part 706 is selected, the process for determining the sheets to be used is the same as when the productivity priority part 705 is selected. Thereafter, the DFE 103 instructs the image forming apparatus 101 to print at the maximum speed that each sheet can be printed. However, if a plurality of sheet types are present, the DFE 103 cannot process those sheets at a single print speed. In other words, when the print speed modes are mixed, it is necessary to switch the print speed mode. The printing is temporarily suspended because the image forming apparatus 101 performs print speed mode switching processing when the printing transitions from one type of sheet to another type of sheet. In this manner, a conventional image forming apparatus 101 performs the print speed mode switching processing according to the type of the sheet, and thus the printing operation takes time.

It is an object of the present invention to shorten the printing operation time even when the print speed mode may be switched in a situation where a plurality of sheet types are mixed, as described above. Specifically, the present invention performs printing on a plurality of types of sheets based on a result of determining whether the overall print time will be shortened if the print speed mode is switched. Through this, the overall print time can be shortened even when it is necessary to perform print speed mode switching processing in accordance with the sheet type.

Based on the above, the DFE 103 executes the following operations when the optimal print speed part 706 is selected.

By confirming sheet information starting with the first page of a print job, the DFE 103 detects a section (corresponding to a "page group") of consecutive sheets indicated as "yes" in the first print speed field 606 (a high-speed printable field).

Then, the DFE 103 determines whether the overall print time will be shorter if the print speed mode is switched for the section of consecutive sheets that can be printed at high speed. The DFE 103 switches the print speed mode if it is determined that the overall print time will be shorter. Note that the DFE 103 determines whether the overall print time will be shorter based on a comparison of the time at which production is interrupted by the print speed switching processing ($T_I$) and the time at which loss occurs due to a sheet that can be printed at high speed being printed at low speed ($T_L$).

The higher the number of consecutive sheets that can be printed at high speed is, the more time will be lost when printing at low speed. Accordingly, when the number of consecutive sheets that can be printed at high speed exceeds a specific number of sheets, the overall print time will be shortened if the image forming apparatus 101 switches the print speed mode. The specific number of sheets (corresponding to a "first specified number of sheets" and a "second specified number of sheets") is called a "break-even sheet number". The method for calculating the break-even sheet number and the method by which the DFE 103 determines the break-even sheet number will be described later.

Figure 8A:
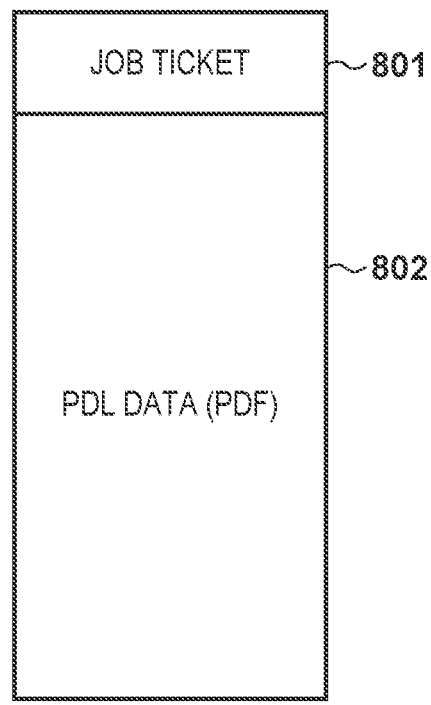
FIG. 8A is a diagram illustrating the overall configuration of print job data.

FIG. 8A is a diagram illustrating the overall configuration of print job data.

The print job data is generated by various types of applications that operate in the information processing apparatus 102 or the like for the purpose of processing by the PDL function program 405.

The print job data is constituted by a plurality of even finer pieces of data. The information processing apparatus 102 transmits print job data to the DFE 103 or the image forming apparatus 101.

A job ticket part 801 is a data part that stores print settings. The job ticket part 801 includes settings such as setting information, various types of post-processing, image processing, and the like applied to the job to be printed as a whole. However, depending on the form and type of the job ticket part 801, there may be cases where setting information for each sheet is included in the job ticket part 801.

A PDL data part 802 is a data part that stores image information constituting a print page and various types of print control commands. FIG. 8A illustrates an example of a data part configured in the PDF format. For example, another type of page description language, such as Postscript, may be used for the PDL data part 802.

The sheet settings used in the printing processing of the respective pages are obtained by expanding the PDL data part 802. In other words, the information on the sheets used in the printing processing for the respective pages is stored in the PDL data part 802. The above-described information is obtained by expanding the PDL data part 802. However, the sheet settings may be configured to be specified in the job ticket part 801.

FIG. 8B is a diagram illustrating sheet information for each page used when printing.

Note that the present embodiment assumes that all of the pages are printed on one side, and that the number of pages to be printed and the number of sheets to be printed are the same. If all pages are printed on both sides, two print pages are printed as a single page.

FIG. 8B illustrates information extracted from the results of analyzing the PDL data part 802 in FIG. 8A. The DFE 103 selects, based on the extracted information, the sheets to be applied at the time of printing for the respective pages constituting the job. The DFE 103 performs sheet feed control by selecting an appropriate sheet from one of the sheet feeding units 225 illustrated in FIG. 1.

A page field 803 indicates a page number in the job data indicated in FIG. 8A.

A sheet ID field 804 and a sheet type field 805 are used when printing the page data indicated in the page field 803. The sheet ID field 804 and the sheet type field 805 are fields in which the sheet information obtained after expanding the PDL data part 802 is stored.

FIG. 8B illustrates an example of print job data that has been set, in which the sheet types are mixed. From pages 1 to 99 (section 806) and pages 601 to 999 (section 810), the sheet ID field 804 is set to "011", and the sheet type is set to "coated paper B".

Likewise, from pages 101 to 599 (section 808) and pages 1001 to 1300 (section 812), the sheet ID field 804 is set to "012", and the sheet type is set to "coated paper C".

For page 100 (section 807), page 600 (section 809), and page 1000 (section 811), the sheet ID field 804 is set to "020", and the sheet type is set to "coated paper X".

Figures 9, 10A:
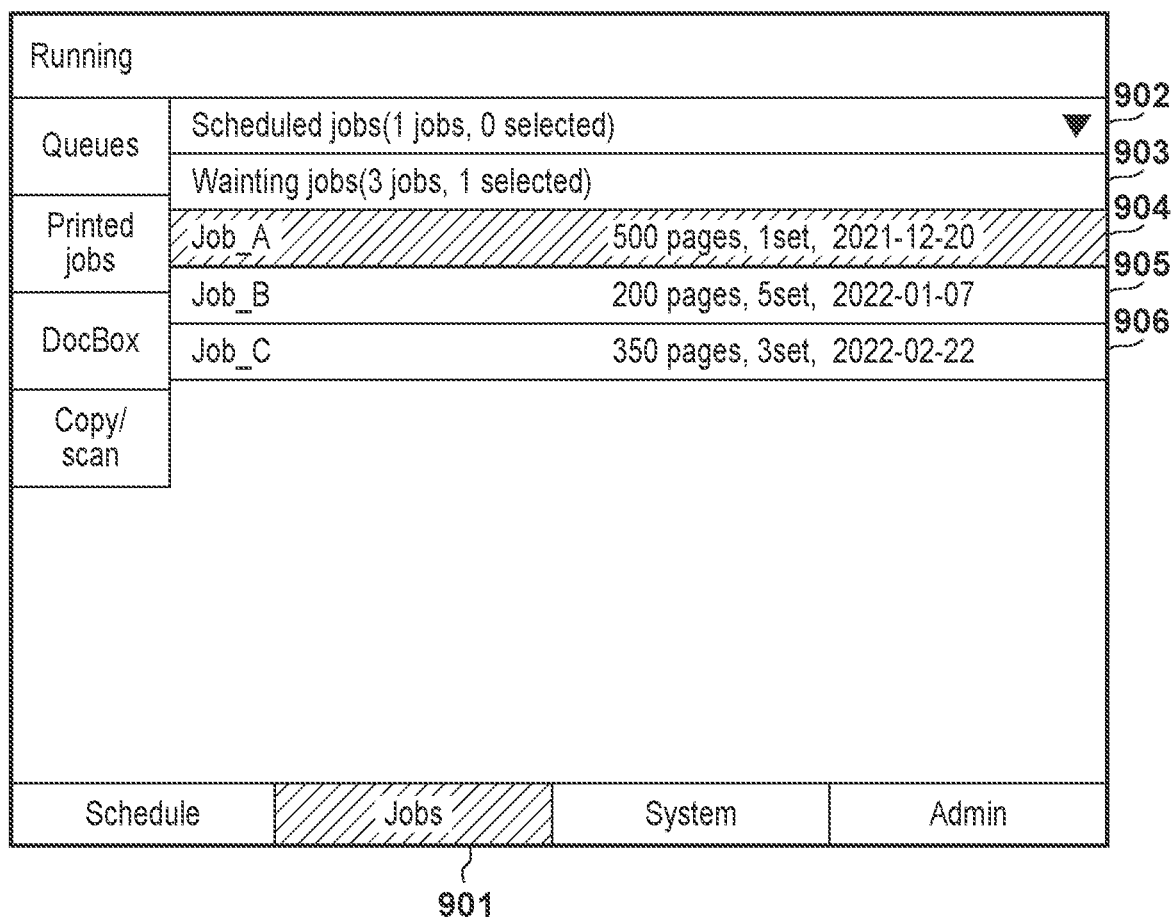
FIG. 9 is a diagram illustrating an example of a job management screen of the DFE apparatus according to the first embodiment.
FIG. 10A is a diagram illustrating a method for calculating a break-even sheet number.

FIG. 9 is a diagram illustrating an example of a job management screen of the DFE apparatus according to the first embodiment.

FIG. 9 illustrates an example of a job management screen displayed in the display unit 310 or the display apparatus 105 of the DFE 103.

A screen configuration in which a job management screen selection part 901 has been selected will be described next. Awaiting job queue 903 indicates a state in which Job_A 904, Job_B 905, and Job_C 906 are registered in the DFE 103.

The information processing apparatus 102 transmits the print job to the DFE 103, and the DFE 103 receives the print job. The print job includes Job_A 904, Job_B 905, and Job_C 906.

When the DFE 103 receives Job_A 904 to Job_C 906, the DFE 103 stands by until the instructions are received from the user.

Note that a scheduled job queue 902 is hidden. If the job data received by the DFE 103 has been registered in the scheduled job queue 902, the DFE 103 causes the image forming apparatus 101 to execute the job in the scheduled job queue 902. In other words, the DFE 103 transmits the received job data to the image forming apparatus 101. The print job is executed by the image forming apparatus 101 processing the job data.

FIG. 10A is a diagram illustrating a method for calculating the break-even sheet number.

The left side of the equation illustrated in FIG. 10A represents a time T (in seconds) required for the speed switch. The right side of the equation indicates a difference between the print time per sheet (in seconds) when printing at a second print speed v2 and the print time per sheet (in seconds) when printing at a first print speed v1, multiplied by a break-even sheet number x.

Here, the first print speed v1 (PPM) and the second print speed v2 (PPM) represent performance values of the image forming apparatus 101. Note that "PPM" is an acronym for "pages per minute", and is an indicator representing the number of pages printed per minute.

FIG. 10B is a diagram illustrating a table expressing relationships between each of MFP models and break-even sheet numbers.

The DFE 103 holds a correspondence table for each MFP model and the break-even sheet number. For example, the DFE 103 obtains an ID 1001 for uniquely identifying the MFP model from the MFP (image forming apparatus 101) via the network control program 503. The DFE 103 then identifies a break-even sheet number 1003 corresponding to the ID 1001.

FIG. 10C is a diagram illustrating a table expressing relationships between each of MFP models and performances thereof.

The DFE 103 holds a table having a speed switching time 1007, a first print speed 1008, and a second print speed 1009 associated with each MFP model. The DFE 103 may then calculate and obtain the break-even sheet number corresponding to each MFP model (the image forming apparatus 101) registered for the ID 1001.

Figures 11, 12A:
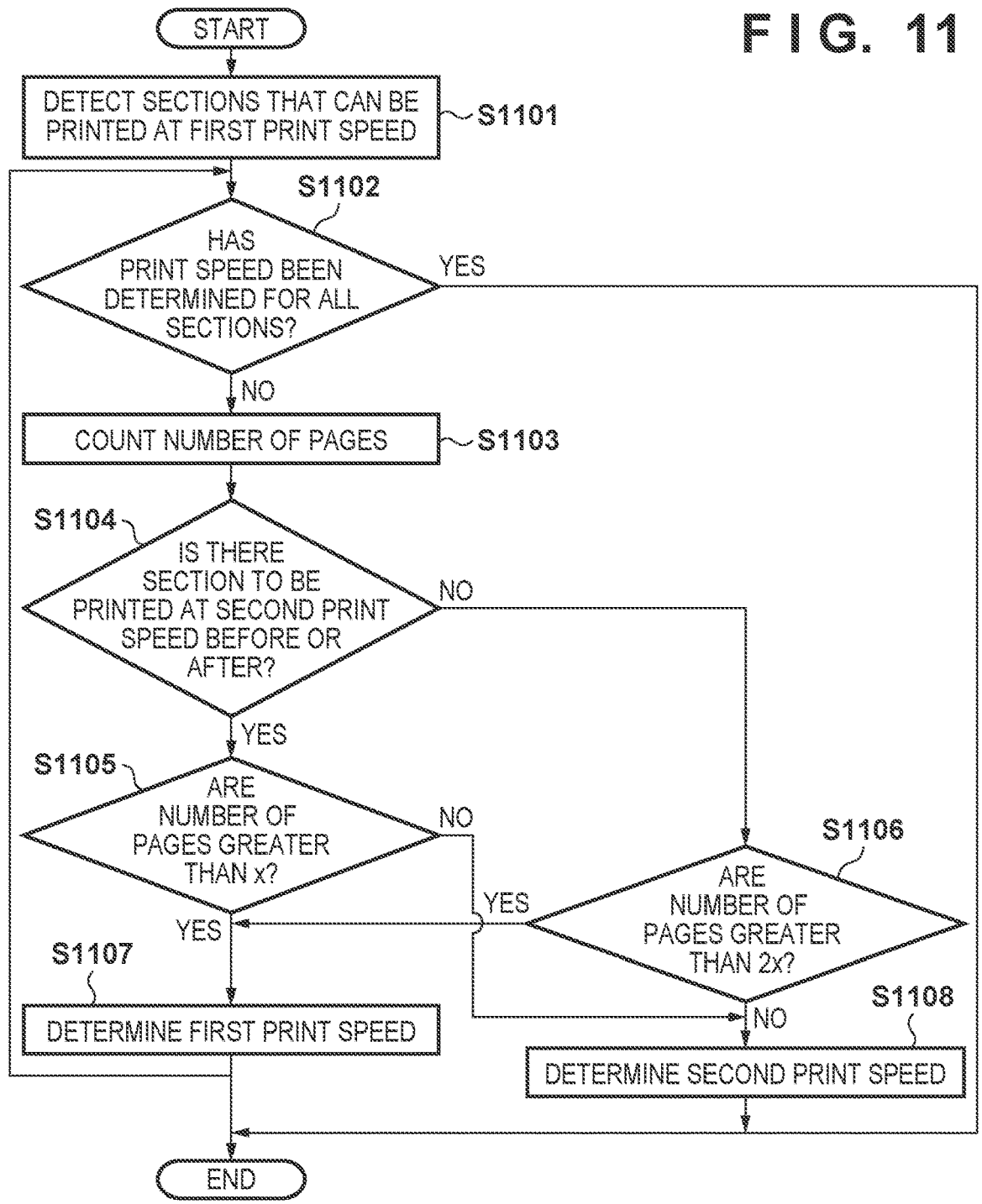
FIG. 11 is a flowchart for determining an optimal print speed mode.
FIG. 12A is a diagram illustrating an example of print conditions.

FIG. 11 is a flowchart for determining an optimal print speed mode.

The processing illustrated in FIG. 11 is realized by the CPU 301 of the DFE 103 executing the job management program 504 and the Pre-RIP program 505.

In step S1101, the CPU 301 analyzes all the pages in a print job. Based on the type of the sheet, the CPU 301 detects sections that can be printed at the first print speed (high speed).

In step S1102, the CPU 301 determines whether the print speed has been determined for all detected sections. If the CPU 301 determines that the print speed has been determined for all of the detected sections (Yes in step S1102), the processing ends. On the other hand, if the CPU 301 determines that the print speed has not been determined for all detected sections (No in step S1102), the sequence moves to step S1103.

In step S1103, the CPU 301 counts the number of pages in the section for which the print speed has not been determined.

In step S1104, the CPU 301 determines whether there is a section to be printed at the second print speed before or after the section for which the print speed has not been determined (i.e., whether the section is at the end of all the pages). If the CPU 301 determines that there is a section to be printed at the second print speed before or after the section for which the print speed has not been determined (Yes in step S1104), the sequence moves to step S1105. On the other hand, if the CPU 301 determines that there is no section to be printed at the second print speed before or after the section for which the print speed has not been determined (No in step S1104), the sequence moves to step S1106.

In step S1105, the CPU 301 determines whether the number of pages in the section for which the print speed has not been determined is greater than the break-even sheet number x. If the CPU 301 determines that the number of pages in the section for which the print speed has not been determined is greater than the break-even sheet number x (Yes in step S1105), the sequence moves to step S1107. On the other hand, if the CPU 301 determines that the number of pages in the section for which the print speed has not been determined is not greater than the break-even sheet number x (No in step S1105), the sequence moves to step S1108.

In step S1106, the CPU 301 determines whether the number of pages in the section for which the print speed has not been determined is greater than twice the break-even sheet number x (i.e., 2x). If the CPU 301 determines that the number of pages in the section for which the print speed has not been determined is greater than twice the break-even sheet number x (i.e., 2x) (Yes in step S1106), the sequence moves to step S1107. If the CPU 301 determines that the number of pages in the section for which the print speed has not been determined is not greater than twice the break-even sheet number x (i.e., 2x) (No in step S1106), the sequence moves to step S1108.

In step S1107, the CPU 301 sets the print speed for the section for which the print speed has not been determined to the first print speed, and the sequence ends.

In step S1108, the CPU 301 sets the print speed for the section in which the print speed has not been determined to the second print speed, and the sequence ends.

Note that in step S1106, the reason why twice the number of the break-even sheet number x is used as the basis of the determination is that the print speed is switched before and after the section for which the print speed has not been determined. The speed switching time T illustrated in FIG. 10A is the amount of time required to switch the print speed once. Accordingly, when the print speed is switched twice, namely before and after the section for which the print speed has not been determined, the switching time is doubled. This doubles the break-even sheet number as a result.

Note that when the print speed mode of the image forming apparatus 101 immediately prior to the execution of the print job is the second print speed (low speed), and there is a section to be printed at the second print speed after the section for which the print speed has not been determined, the print speed is switched twice. The sequence therefore moves to step S1106. When a plurality of jobs are executed consecutively, the processing illustrated in FIG. 11 may be applied to the plurality of jobs as a whole, rather than to each job.

Here, how the print speed is determined when the processing of FIG. 11 is applied to the jobs in FIGS. 8A and 8B will be described. Note that a case where the break-even sheet number x is 236 and the MFP model B (the image forming apparatus 101) is used will be described as an example, as indicated by row 1005 in FIG. 10B.

In step S1101, the CPU 301 detects the sections that can be printed at the first print speed (high speed). In the print job illustrated in FIG. 8B, the sections that can be printed at the first print speed are pages 1 to 99 (section 806), pages 101 to 599 (section 808), pages 601 to 999 (section 810), and pages 1001 to 1300 (section 812).

In step S1102, it is assumed that the print speed has not been determined for sections 806, 808, 810, and 812, and the sequence moves to step S1103.

In step S1103, the CPU 301 counts the number of pages in each of sections 806, 808, 810, and 812. The number of pages in section 806 is 99. The number of pages in section 808 is 499. The number of pages in section 810 is 399. The number of pages in section 812 is 300.

In step S1104, the CPU 301 determines whether there is a section to be printed at the second print speed before or after each of sections 806, 808, 810, and 812. The CPU 301 determines that there is a section to be printed at the second print speed after section 806 (section 807), and the sequence moves to step S1105. The CPU 301 determines that there are sections to be printed at the second print speed before and after section 808 (sections 807 and 809), and the sequence moves to step S1106. The CPU 301 determines that there are sections to be printed at the second print speed before and after section 810 (sections 809 and 811), and the sequence moves to step S1106. The CPU 301 determines that there is a section to be printed at the second print speed before section 812 (section 811), and the sequence moves to step S1105.

In step S1105, the CPU 301 determines that the number of pages in section 806 (99 pages) is not greater than the break-even sheet number x (236 sheets), and the sequence moves to step S1108. The CPU 301 determines that the number of pages in section 808 (499 pages) is greater than the break-even sheet number x (236 sheets), and the sequence moves to step S1107.

In step S1106, the CPU 301 determines that the number of pages in section 810 (399 pages) is not greater than the break-even sheet number 2x (236 sheets×2=472 sheets), and the sequence moves to step S1108. The CPU 301 determines that the number of pages in section 812 (300 pages) is greater than the break-even sheet number 2x (236 sheets×2=472 sheets), and the sequence moves to step S1107.

In step S1107, the CPU 301 sets the print speed of the sections 808 and 812 to the first print speed.

In step S1108, the CPU 301 sets the print speed of the sections 806 and 810 to the second print speed.

As described above, according to the present embodiment, the first print speed or the second print speed can be set as the print speed of the section to be printed at the first print speed in order to minimize the overall print time.

Figure 14B:
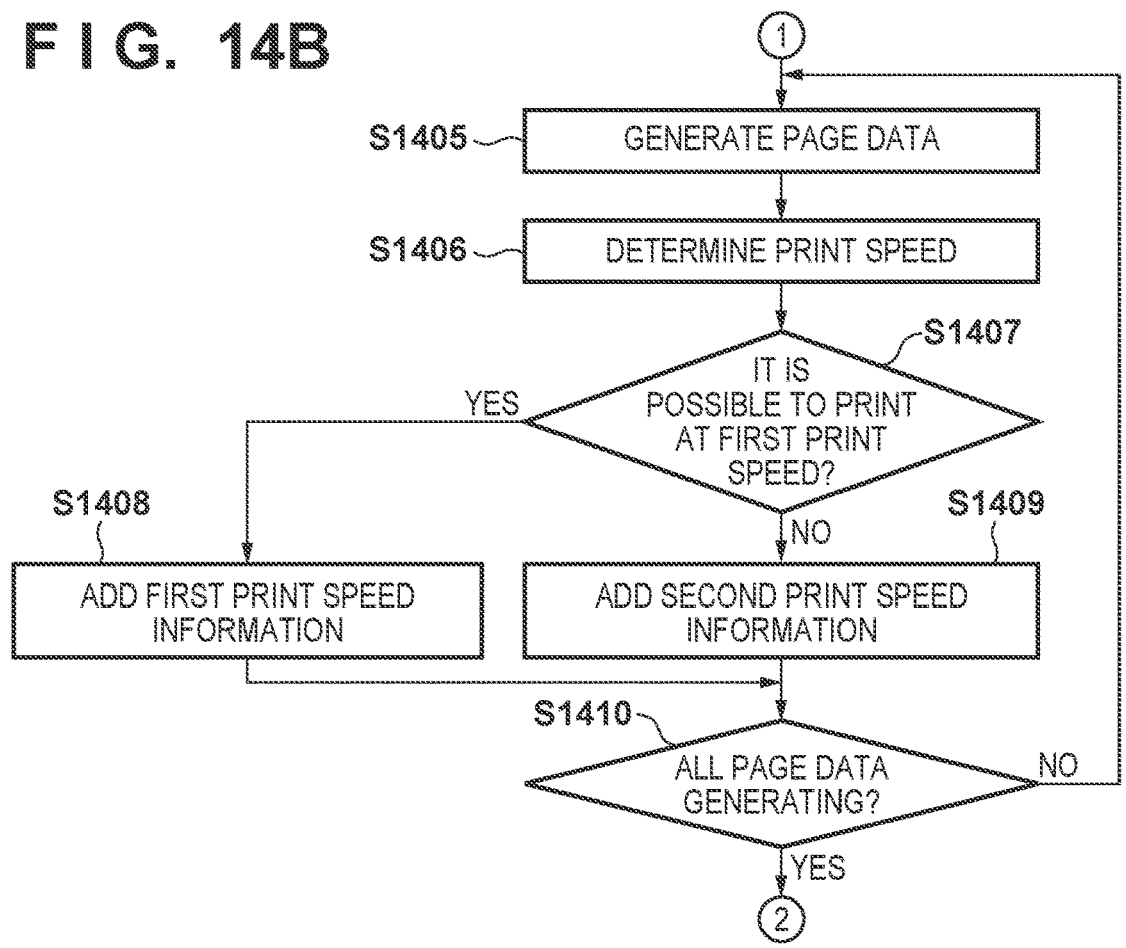

FIGS. 14A to 14B is a flowchart illustrating processing performed by the DFE apparatus according to the first embodiment. The information processing apparatus 102 transmits a print job to the DFE 103. The DFE 103 transmits the print job to the image forming apparatus 101.

The processing for analyzing the print job data and determining the print speed through the execution of the Pre-RIP program 505, and the processing for expanding the print job data through the execution of the PDL function program 506, are performed before the user executes the print job. However, this processing may be performed after the print job has been executed. Note that the processing illustrated in FIGS. 14A to 14B is processing performed when a print job registered in the waiting job queue 903 is executed. Additionally, the processing in FIGS. 14A to 14B is implemented by the CPU 301 of the DFE 103 executing the programs.

In step S1401, the CPU 301 analyzes the data of the job ticket part 801 in the print job data. The job ticket part 801 includes settings such as setting information, various types of post-processing, image processing, and the like applied to the job to be printed as a whole.

In step S1402, the CPU 301 starts the processing for expanding the PDL data part 802. The expansion processing includes converting and generating the image data to be printed. This processing is performed in parallel with page data generation processing (the processing of steps S1405, S1411, and S1414), which is part of the printing processing.

In step S1403, the CPU 301 determines whether the optimal print speed part 706 is set in the productivity setting part 703. If the CPU 301 determines that the optimal print speed part 706 is set in the productivity setting part 703 (Yes in step S1403), the sequence moves to step S1414. On the other hand, if the CPU 301 determines that the optimal print speed part 706 is not set in the productivity setting part 703 (No in step S1403), the sequence moves to step S1404.

In step S1404, the CPU 301 determines whether the productivity priority part 705 is set in the productivity setting part 703. If the CPU 301 determines that the productivity priority part 705 is set in the productivity setting part 703 (Yes in step S1404), the sequence moves to step S1405. On the other hand, if the CPU 301 determines that the productivity priority part 705 is not set in the productivity setting part 703 (No in step S1404), the sequence moves to step S1411.

In step S1405, the CPU 301 generates the page data used at the time of printing from the PDL data expanded in step S1402. For example, the CPU 301 converts the data of the PDL data part 802 into bitmap format data as a format for the printing unit 203 to form an image on the sheet.

In step S1406, the CPU 301 determines the print speed information when printing the generated page data on the sheet.

In step S1407, the CPU 301 determines whether the print speed information includes the first print speed. If the CPU 301 determines that the print speed information includes the first print speed (Yes in step S1407), the sequence moves to step S1408. If the CPU 301 determines that the print speed information does not include the first print speed (No in step S1407), the sequence moves to step S1409.

In step S1408, the CPU 301 adds the first print speed information to the generated page data.

In step S1409, the CPU 301 adds the second print speed information to the generated page data.

In step S1410, the CPU 301 determines whether the processing for generating all the page data has ended. If the CPU 301 determines that the processing for generating all the page data has ended (Yes in step S1410), the sequence moves to step S1419. On the other hand, if the CPU 301 determines that the processing for generating all the page data has not ended (No in step S1410), the sequence returns to step S1405.

The processing of step S1411 is similar to the processing of step S1405, and thus descriptions thereof will be omitted.

In step S1412, the CPU 301 adds the second print speed information to the page data generated in step S1411.

In step S1413, the CPU 301 determines whether the processing for generating all the page data has ended. If the CPU 301 determines that the processing for generating all the page data has ended (Yes in step S1413), the sequence moves to step S1419. On the other hand, if the CPU 301 determines that the processing for generating all the page data has not ended (No in step S1413), the sequence returns to step S1411.

The processing of step S1414 is similar to the processing of step S1405, and thus descriptions thereof will be omitted.

In step S1415, the CPU 301 determines the print speed information when printing the page data generated in step S1414 on the sheet.

In step S1416, the CPU 301 stores the print speed information of the sheet in the RAM 302.

In step S1417, the CPU 301 determines whether the processing for generating all the page data has ended. If the CPU 301 determines that the processing for generating all the page data has ended (Yes in step S1417), the sequence moves to step S1418. On the other hand, if the CPU 301 determines that the processing for generating all the page data has not ended (No in step S1417), the sequence returns to step S1414.

In step S1418, the CPU 301 determines the print speed for each section based on the print speed information in the RAM 302, and adds the print speed information to the page data. Note that the processing of step S1418 has been described in detail with reference to FIG. 11 and will therefore not be described here.

In step S1419, the CPU 301 accepts a job execution instruction from the user. For example, the CPU 301 deletes a job registered in the waiting job queue 903 and adds the job to the scheduled job queue 902.

In step S1420, the CPU 301 transmits the job to the image forming apparatus 101, and the process ends.

Figure 15:
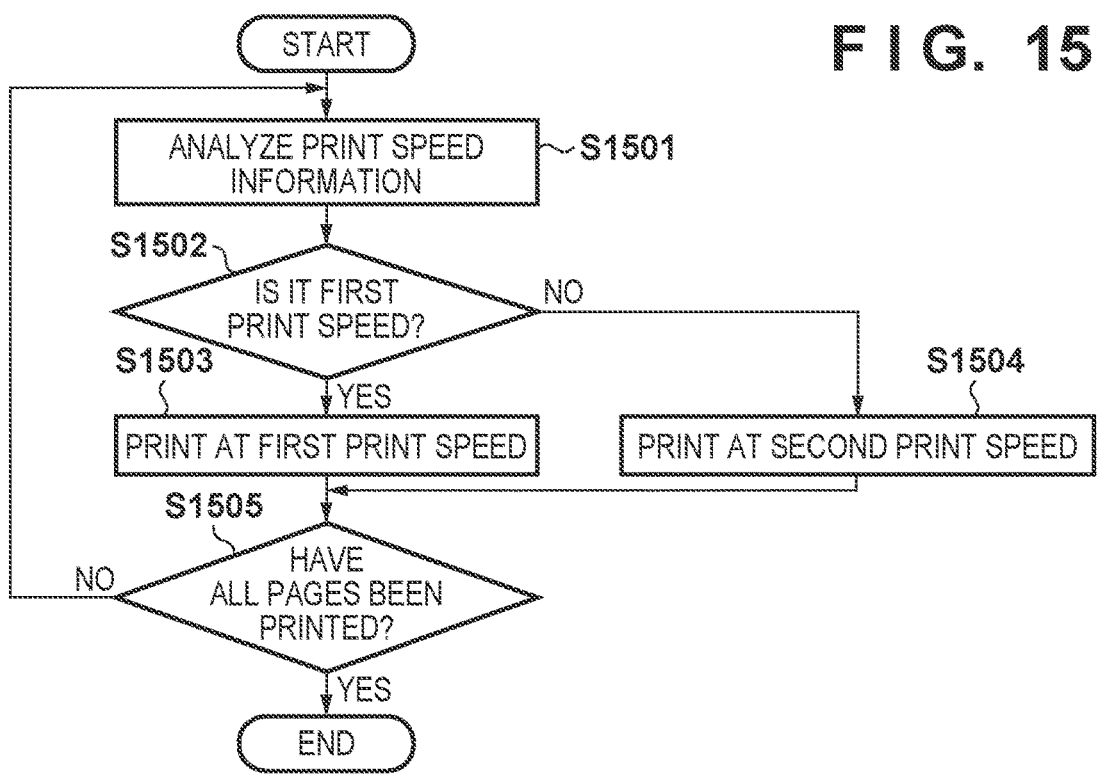
FIG. 15 is a flowchart illustrating processing performed by the image forming apparatus according to the first embodiment.

FIG. 15 is a flowchart illustrating processing performed by the image forming apparatus according to the first embodiment.

The DFE 103 transmits a job to the image forming apparatus 101. The image forming apparatus 101 then prints based on the job. The processing illustrated in FIG. 15 is realized by the control unit 205 of the image forming apparatus 101 executing the PDL function program 405.

In step S1501, the control unit 205 analyzes the print speed information of the sheets in each page of the received job data.

In step S1502, the control unit 205 determines whether the print speed information is the first print speed. If the control unit 205 determines that the print speed information is the first print speed (Yes in step S1502), the sequence moves to step S1503. On the other hand, if the control unit 205 determines that the print speed information is not the first print speed (No in step S1502), the sequence moves to step S1504.

In step S1503, the control unit 205 prints the image of the job data on the sheet at the first print speed.

In step S1504, the control unit 205 prints the image of the job data on the sheet at the second print speed.

In step S1505, the control unit 205 determines whether all the page data has been printed. If the control unit 205 determines that the printing processing for all the page data has ended (Yes in step S1505), the sequence ends. On the other hand, if the control unit 205 determines that the printing processing for all the page data has not ended (No in step S1505), the sequence returns to step S1501.

Note that print speed information is added to the page field 803 (sheet) by the DFE 103. However, if the image forming apparatus 101 has determined that the print speed information is not in the page field 803 when the job data is received, the print speed may be determined based on the sheet information included in the job data.

FIG. 12A is a diagram illustrating an example of print conditions.

A comparison between a case where the DFE 103 switches the print speed based on the break-even sheet number when processing the job illustrated in FIGS. 8A to 8B, and a case using the conventional method, will be described here. "Conventional method" refers to a case where the print speed has been switched so that all the sheets that can be printed at the first print speed are printed at the first print speed (i.e., a "productivity priority setting").

In FIG. 12A, the first print speed in the high-speed printing mode of the image forming apparatus 101 is 135 ppm (pages per minute). Meanwhile, the second print speed in the low-speed printing mode is 105 ppm (pages per minute). The switching times from the first print speed to the second print speed, and from the second print speed to the first print speed, are 30 seconds. The job data is the data illustrated in FIGS. 8A to 8B.

FIGS. 12B to 12D are diagrams illustrating a time required for the conventional printing processing.

FIGS. 12B to 12D illustrate the time required by the conventional image forming apparatus 101 to switch the print speed and the time required for printing based on the print conditions illustrated in FIG. 12A. The vertical axes in FIGS. 12B to 12D represent a first print speed 1201, a second print speed 1202, and a switching time 1203. A horizontal axis 1204 in FIGS. 12B to 12D represents the time from the start of printing to the end of printing.

For example, a time 1205 is the time required when the image forming apparatus 101 prints at the first print speed 1201, and is 44 seconds. A time 1206 is the time required for the image forming apparatus 101 to switch from the first print speed 1201 to the second print speed 1202, and is 30 seconds. A time 1207 is the time required when the image forming apparatus 101 prints at the second print speed 1202, and is 0.6 seconds. A time 1208 is the time required for the image forming apparatus 101 to switch from the second print speed 1202 to the first print speed 1201, and is 30 seconds. A time 1209 is the time required when the image forming apparatus 101 prints at the first print speed 1201, and is 221.8 seconds. Note that for each time described above, the second decimal place is rounded off and the time is denoted as a numerical value up to the first decimal place.

As illustrated in FIGS. 8B and 6, coated paper A, which is indicated as printable in the first print speed field 606, is used from pages 1 to 99 (section 806) of the job data. Accordingly, the image forming apparatus 101 can print images onto coated paper A in the high-speed printing mode (135 ppm). In this case, the time 1205 required for printing is 44 seconds, as described above.

On the other hand, coated paper X, which is indicated as printable in the second print speed field 607, is used for page 100 (section 807). Accordingly, the image forming apparatus 101 switches the print speed from the first print speed field 606 to the second print speed. The print speed switching time 1206 is therefore required. In this case, the image forming apparatus 101 performs the printing processing for page 100 after the print speed switching processing ends. The time 1207 required for printing is 0.6 seconds, as described above.

Likewise, the time required for printing and the time required for switching the print speed are also calculated for the remaining pages in FIG. 8B (pages 101 to 1300 in FIGS. 12C and 12D). Adding up the calculated amounts of time results in a time 1218 required for the overall printing being 758.2 seconds.

Figure 12G:
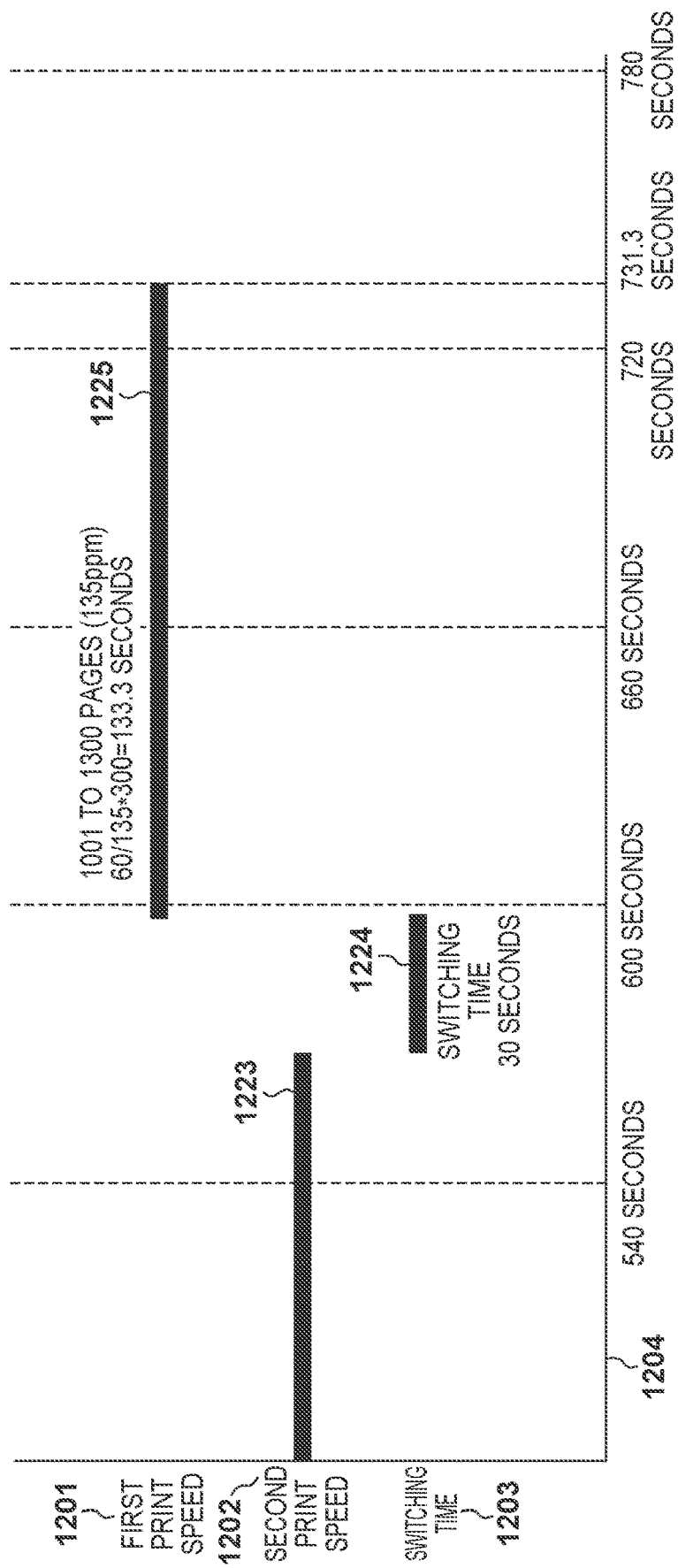
FIG. 12G is a diagram illustrating a time required for printing processing according to the first embodiment.

FIGS. 12E to 12G are diagrams illustrating the time required for printing processing according to the first embodiment.

FIGS. 12E to 12G illustrate the time required for the image forming apparatus 101 to switch the print speed and the time required for printing according to the present embodiment, based on the print conditions illustrated in FIG. 12A. The vertical axes illustrated in FIGS. 12E to 12G represent the first print speed 1201, the second print speed 1202, and the switching time 1203. The horizontal axis 1204 in FIGS. 12E to 12G represents the time from the start of printing to the end of printing.

For example, a time 1219 is the time required when the image forming apparatus 101 prints at the second print speed 1202, and is 57.1 seconds. A time 1220 is the time required for the image forming apparatus 101 to switch from the second print speed 1202 to the first print speed 1201, and is 30 seconds. A time 1221 is the time required when the image forming apparatus 101 prints at the first print speed 1201, and is 221.8 seconds. A time 1222 is the time required for the image forming apparatus 101 to switch from the first print speed 1201 to the second print speed 1202, and is 30 seconds. A time 1223 is the time required when the image forming apparatus 101 prints at the second print speed 1202, and is 229.1 seconds. A time 1224 is the time required for the image forming apparatus 101 to switch from the second print speed 1202 to the first print speed 1201, and is 30 seconds. A time 1225 is the time required when the image forming apparatus 101 prints at the first print speed 1201, and is 133.3 seconds. Note that for each time described above, the second decimal place is rounded off and the time is denoted as a numerical value up to the first decimal place.

As illustrated in FIGS. 8B and 6, coated paper A, which is indicated as printable in the first print speed field 606, and coated paper X, which is indicated as printable in the second print speed field 607, are used from pages 1 to 100 (sections 806 and 807) of the job data. Here, the image forming apparatus 101 prints an image on the coated paper A and the coated paper X according to the second print speed field 607 (105 ppm). In this case, the time 1219 required for printing is 57.1 seconds, as described above.

The image forming apparatus 101 switches the print speed from the second print speed field 607 to the first print speed field 606. The print speed switching time 1220 is therefore required. In this case, the image forming apparatus 101 performs the printing processing for pages 101 to 599 (section 808) after the print speed switching processing ends. The time 1221 required for printing is 221.8 seconds, as described above.

Likewise, the time required for printing and the time required for switching the print speed are calculated for the remaining pages (pages 600 to 1300, indicated in FIGS. 12F and 12G). Adding up the calculated amounts of time results in a time required for the overall printing being 731.3 seconds.

As described thus far, when the job data illustrated in FIGS. 8A to 8B is printed using the conventional method and the present embodiment, the time required for printing in the present embodiment is 25.8 seconds shorter than in the conventional method. In this manner, according to the present embodiment, printing can be performed efficiently even for print jobs in which sheet types are mixed.

Second Embodiment

The first embodiment described a method in which the print speed mode for a group of sheets that can be printed at high speed is switched to minimize the overall print time, for a print job including sheets that can be printed at both low and high speeds and sheets which can be printed only at low speed.

The second embodiment describes printing an image onto a sheet of a plurality of printing sections that can be printed in three types of print speed modes. A method for determining the print speed mode when printing each of a plurality of printing sections in order to print efficiently at this time will be described.

Figure 13:
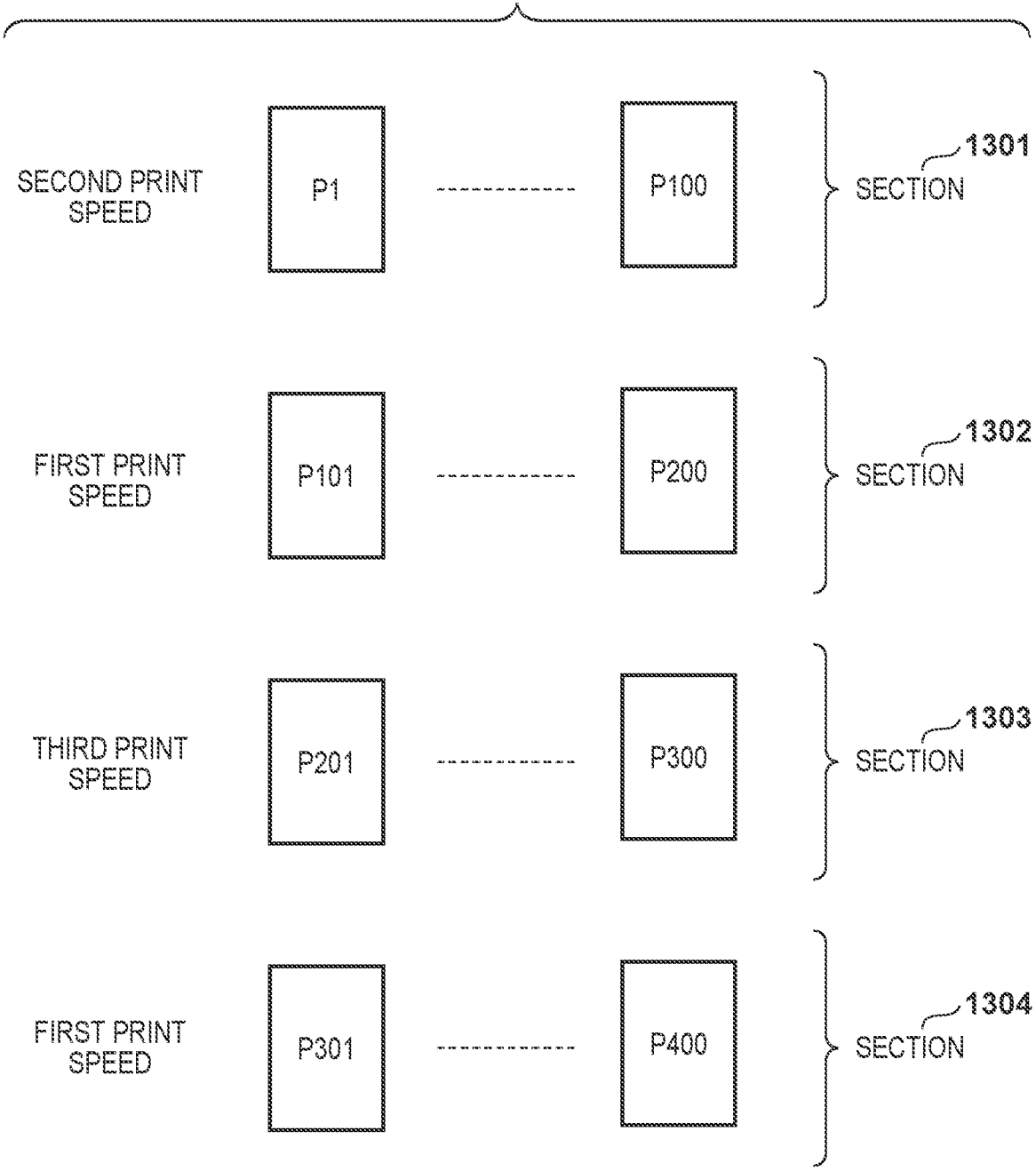
FIG. 13 is a diagram illustrating a case where printing is performed using three types of print speed modes, according to a second embodiment.

FIG. 13 is a diagram illustrating a case where printing is performed using three types of print speed modes, according to the second embodiment.

The image forming apparatus 101 can apply a maximum of three types of print speed modes to a sheet type. The three types of print speeds (corresponding to "transport speed candidates") are the first print speed, the second print speed, and a third print speed. The print speed is assumed to increase in the order of the first print speed, the second print speed, and the third print speed (first print speed>second print speed>third print speed).

For example, section 1301 indicates that pages 1 (P1) to 100 (P100) of the job are printed at the second print speed.

Section 1302 indicates that pages 101 (P101) to 200 (P200) of the job are printed at the first print speed.

Section 1303 indicates that pages 201 (P201) to 300 (P300) of the job are printed at the third print speed.

Section 1304 indicates that pages 301 (P301) to 400 (P400) of the job are printed at the first print speed.

Here, sheets that can be printed at the first print speed may be printed at the first to third print speeds. Likewise, sheets that can be printed at the second print speed can be printed at the second and third print speeds. Sheets that can be printed at the third print speed can be printed only at the third print speed. Accordingly, the sheets in section 1301 can be printed at two types of print speeds (the second and third print speeds). The sheets in section 1302 can be printed at three types of print speeds (the first to third print speeds). The sheets in section 1303 can be printed at one type of print speed (the third print speed). The sheets in section 1304 can be printed at three types of print speeds (the first to third print speeds).

As a result, there are 18 combinations of print speeds for all sections (=2×3×1×3). Accordingly, the DFE 103 calculates the overall print time taking into account the print speed switching time for the 18 print speed combinations.

Then, the DFE 103 compares the print times calculated for the respective combinations, and assigns the print speeds to the respective print sections based on the combinations of print speeds in which the overall print time is the lowest. Note that this method is not limited to the case where there are three types of print speed modes, and can also be applied when there are at least four print speed modes.

As described thus far, the DFE 103 according to the present embodiment determines the information on the sheets of the job data prior to the start of printing. The DFE 103 also controls the printing by the image forming apparatus 101 such that the print speed is switched only when the overall print time becomes shorter for each section that can be printed at high speed, based on the determined information. This makes it possible to reduce the overall job time by taking into account the print speed switching time, even when printing is performed based on a job in which a plurality of printing sections that can be printed at a plurality of print speeds (three or more types of print speeds) are mixed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application 2022-122810, filed Aug. 1, 2022, which is hereby incorporated by reference herein in its entirety.

What is claimed is:

1. An information processing apparatus comprising:
   at least one processor; and
   at least one memory coupled to the at least one processor, the memory storing instructions that, when executed by the processor, cause the processor to act as:
   an obtaining unit configured to obtain a job including a plurality of pages;
   a determining unit configured to determine a page group constituted by consecutive sheets of a same sheet type, from the plurality of pages included in the job obtained by the obtaining unit; and
   a setting unit configured to set a transport speed of sheets in the page group determined by the determining unit,
   wherein from the plurality of pages, the determining unit specifies a first page group constituted by consecutive sheets of a first sheet type, and a second page group that is adjacent to the first page group and that is constituted by consecutive sheets of a second sheet type different from the first sheet type, and
   when a first transport speed corresponding to the first sheet type is faster than a second transport speed corresponding to the second sheet type, and a number of pages in the first page group is less than a specified number of pages, the setting unit sets the second transport speed for the first page group and the second page group, and when the first transport speed corresponding to the first sheet type is faster than the second transport speed corresponding to the second sheet type, and the number of pages in the first page group is greater than the specified number, the setting unit sets the first transport speed for the first page group and the second transport speed for the second page group.

2. The information processing apparatus according to claim 1,
   wherein the setting unit further changes the specified number of pages based on a position of the first page group in the plurality of pages.

3. The information processing apparatus according to claim 2,
   wherein the specified number of pages when the position of the first page group is at an end of the plurality of pages is lower than when the position of the first page group is not at an end of the plurality of pages.

4. The information processing apparatus according to claim 1,
   wherein the setting unit reduces the specified number of pages when the position of the first page group is at an end of the plurality of pages, and increases the specified number of pages when the position of the first page group is not at an end of the plurality of pages.

5. The information processing apparatus according to claim 1,
   wherein the setting unit calculates the specified number of pages based on the first transport speed, the second transport speed, and a switching time between the first transport speed and the second transport speed, obtained from an image forming apparatus.

6. The information processing apparatus according to claim 5, further comprising:
   a holding unit that holds information specifying the specified number of pages corresponding to each of a plurality of image forming apparatuses.

7. The information processing apparatus according to claim 6,
   wherein the holding unit further holds the first transport speed, the second transport speed, and the switching time between the first transport speed and the second transport speed, corresponding to each of the plurality of image forming apparatuses.

8. The information processing apparatus according to claim 1,
wherein when a plurality of jobs, each including a plurality of pages, have been obtained by the obtaining unit, the determining unit specifies the page group constituted by consecutive sheets of the same sheet type, from all the plurality of pages included in the plurality of jobs.

9. The information processing apparatus according to claim 1,
wherein the first sheet type corresponds to both the first transport speed and the second transport speed that is slower than the first transport speed, and
the second sheet type corresponds only to the second transport speed.

10. The information processing apparatus according to claim 9,
wherein when the plurality of pages further include a third sheet type that corresponds to the first transport speed, the second transport speed, and a third transport speed faster than the first transport speed, the determining unit further specifies a third page group constituted by consecutive sheets of a third sheet type from the plurality of pages, and
based on combinations of transport speeds that can be set for the first page group, the second page group, and the third page group, the setting unit calculates a time for processing the job for each of the combinations, and sets transport speeds for the first page group, the second page group, and the third page group based on a combination of transport speeds for which the time calculated is the shortest.

11. The information processing apparatus according to claim 1, further comprising:
an output unit configured to output a job based on a setting result from the setting unit.

12. An image forming system comprising:
an image forming apparatus configured to record an image onto a sheet; and
the information processing apparatus according to claim 1.

13. A method comprising:
obtaining a job including a plurality of pages;
determining a page group constituted by consecutive sheets of a same sheet type, from the plurality of pages included in the job obtained by the obtaining; and
setting a transport speed of sheets in the page group determined by the determining,
wherein from the plurality of pages, the determining specifies a first page group constituted by consecutive sheets of a first sheet type, and a second page group that is adjacent to the first page group and that is constituted by consecutive sheets of a second sheet type different from the first sheet type, and
when a first transport speed corresponding to the first sheet type is faster than a second transport speed corresponding to the second sheet type, and a number of pages in the first page group is less than a specified number of pages, the setting sets the second transport speed for the first page group and the second page group, and when the first transport speed corresponding to the first sheet type is faster than the second transport speed corresponding to the second sheet type, and the number of pages in the first page group is greater than the specified number, the setting sets the first transport speed for the first page group and the second transport speed for the second page group.

14. A non-transitory computer-readable storage medium storing instructions that, when executed by a computer, cause the computer to perform a method comprising:
obtaining a job including a plurality of pages;
determining a page group constituted by consecutive sheets of a same sheet type, from the plurality of pages included in the job obtained by the obtaining; and
setting a transport speed of sheets in the page group determined by the determining,
wherein from the plurality of pages, the determining specifies a first page group constituted by consecutive sheets of a first sheet type, and a second page group that is adjacent to the first page group and that is constituted by consecutive sheets of a second sheet type different from the first sheet type, and
when a first transport speed corresponding to the first sheet type is faster than a second transport speed corresponding to the second sheet type, and a number of pages in the first page group is less than a specified number of pages, the setting sets the second transport speed for the first page group and the second page group, and when the first transport speed corresponding to the first sheet type is faster than the second transport speed corresponding to the second sheet type, and the number of pages in the first page group is greater than the specified number, the setting sets the first transport speed for the first page group and the second transport speed for the second page group.

* * * * *